United States Patent
Maamari et al.

(10) Patent No.: US 12,452,845 B2
(45) Date of Patent: Oct. 21, 2025

(54) MULTI-CAST MULTI-SLOT SEMI-PERSISTENT SCHEDULING COMMUNICATIONS

(71) Applicant: QUALCOMM Incorporated, San Diego, CA (US)

(72) Inventors: Diana Maamari, San Diego, CA (US); Le Liu, San Jose, CA (US); Iyab Issam Sakhnini, San Diego, CA (US); Ahmed Elshafie, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 18/317,010

(22) Filed: May 12, 2023

(65) Prior Publication Data

US 2024/0381327 A1   Nov. 14, 2024

(51) Int. Cl.
*H04W 72/0446* (2023.01)
*H04L 5/00* (2006.01)
*H04W 72/23* (2023.01)

(52) U.S. Cl.
CPC ....... *H04W 72/0446* (2013.01); *H04L 5/0053* (2013.01); *H04W 72/23* (2023.01)

(58) Field of Classification Search
CPC .. H04L 5/0053; H04W 72/23; H04W 72/0446
USPC ........................................................ 370/329
See application file for complete search history.

(56) References Cited

U.S. PATENT DOCUMENTS 12,389,411 B2 *   8/2025   Oteri .................. H04L 1/1854
2023/0189298 A1 *  6/2023   Lee .................... H04W 72/30

FOREIGN PATENT DOCUMENTS

WO    WO-2022240198 A1    11/2022

OTHER PUBLICATIONS

International Search Report and Written Opinion—PCT/US2024/024270—ISA/EPO—Jul. 4, 2024.
MCC Support: "Draft Report of 3GPP TSG RAN WG1 #107bis-e v0.1.1 (Online meeting, Jan. 17-25, 2022)", 3GPP TSG RAN WG1 Meeting #108-e, DRAFT_MINUTES_REPORT_RAN1#107B-E_V011, 3rd Generation Partnership Project, Mobile Competence Centre, 650, Route Des Lucioles, F-06921 Sophia-Antipolis Cedex, France, vol. RAN WG1, No. e-Meeting, Feb. 21, 2022-Mar. 3, 2022, Jan. 28, 2022, 81 Pages, XP052122252, section 8.

* cited by examiner

*Primary Examiner* — Peter G Solinsky
(74) *Attorney, Agent, or Firm* — Paul M. McAdams; Holland & Hart LLP

(57) ABSTRACT

Methods, systems, and devices for wireless communications are described. A user equipment (UE) may receive first control information indicative of a resource allocation for reception of periodic multi-slot multi-cast transmissions. In some aspects, the control information may indicate a semi-persistent scheduling (SPS) configuration for multi-cast, multi-slot signaling. The resource allocation may include a set of multiple reception occasions over a set of multiple slots. The UE may receive one or more transport blocks during the set of multiple reception occasions over the set of multiple slots. In some aspects, the UE may transmit feedback information for the one or more transport blocks.

30 Claims, 16 Drawing Sheets

MULTI-CAST MULTI-SLOT SEMI-PERSISTENT SCHEDULING COMMUNICATIONS

INTRODUCTION

The following relates to wireless communications, including multi-cast multi-slot semi-persistent scheduling (SPS) communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multi-cast multi-slot semi-persistent scheduling (SPS) communications. For example, the described techniques provide for a multi-cast SPS configuration with multi-slot physical downlink shared channel (PDSCH) occasions in a single SPS period. In some aspects, multi-cast SPS with multi-slot PDSCH may be configured separately from unicast SPS and separately from multi-cast SPS with a single PDSCH occasion. In some other aspects, multi-cast SPS with multi-slot PDSCH may be configured via a same control signaling as other multi-cast SPS configurations, but the control signaling may indicate parameters to configure multiple PDSCH occasions. The reception occasions (e.g., PDSCH occasions) for the multi-cast SPS with multi-slot PDSCH occasions may be used for repetition of a transport block or retransmissions of a previously transmitted transport block which was unsuccessfully received or decoded by one or more of the UEs. In some aspects, a network entity may encode transport blocks for a same SPS occasion with different modulation and coding schemes (MCS). In some aspects, a UE may provide acknowledgment or negative feedback for each reception occasion. In some other aspects, the UE may only provide feedback if the UE detects a negative acknowledgment or non-receipt for one or more of the transport blocks.

A method of wireless communication performed by a first network node is described. The method may include receiving first control information indicative of a resource allocation for reception of periodic multi-slot multi-cast transmissions, where the resource allocation includes a set of multiple reception occasions over a set of multiple slots and receiving one or more transport blocks during the set of multiple reception occasions over the set of multiple slots.

An apparatus for wireless communication at a first network node is described. The apparatus may include a processor, memory coupled with the processor, and instructions stored in the memory. The instructions may be executable by the processor to cause the apparatus to receive first control information indicative of a resource allocation for reception of periodic multi-slot multi-cast transmissions, where the resource allocation includes a set of multiple reception occasions over a set of multiple slots and receive one or more transport blocks during the set of multiple reception occasions over the set of multiple slots.

Another apparatus for wireless communication at a first network node is described. The apparatus may include means for receiving first control information indicative of a resource allocation for reception of periodic multi-slot multi-cast transmissions, where the resource allocation includes a set of multiple reception occasions over a set of multiple slots and means for receiving one or more transport blocks during the set of multiple reception occasions over the set of multiple slots.

A non-transitory computer-readable medium having code for wireless communication at a first network node is described. The code may be executable to receive first control information indicative of a resource allocation for reception of periodic multi-slot multi-cast transmissions, where the resource allocation includes a set of multiple reception occasions over a set of multiple slots and receive one or more transport blocks during the set of multiple reception occasions over the set of multiple slots.

Some examples of the method, apparatuses, and non-transitory computer-readable medium described herein may further include operations, features, means, or instructions for receiving second control information configured to activate the resource allocation for the reception of the periodic multi-slot multi-cast transmissions based on a radio network temporary identifier associated with group signaling.

In some examples of the method, apparatuses, and non-transitory computer-readable medium described herein, the one or more transport blocks includes an initial instance of a first transport block and one or more additional instances of the first transport block.

In some examples of the method, apparatuses, and non-transitory computer-readable medium described herein, the one or more transport blocks includes one or more instances of a second transport block different from the first transport block and an order within the set of multiple reception occasions of the initial instance of the first transport block, the one or more additional instances of the first transport block, and the one or more instances of the second transport block may be in accordance with an indicated order.

Some examples of the method, apparatuses, and non-transitory computer-readable medium described herein may further include operations, features, means, or instructions for transmitting a negative acknowledgement, where the negative acknowledgment may be indicative of non-receipt of an initial instance of a first transport block of the one or more transport blocks during a first reception occasion, where the one or more transport blocks includes one or more retransmissions of the first transport block during additional reception occasions that may be subsequent to the first reception occasion.

Some examples of the method, apparatuses, and non-transitory computer-readable medium described herein may further include operations, features, means, or instructions for skipping, based on a successful decode of a first transport block received during a first reception occasion, monitoring for an additional one or more reception occasions that may be subsequent to the first reception occasion, where the additional one or more reception occasions may be associated with respective retransmissions of the first transport block, and where the one or more transport blocks include the first transport block.

In some examples of the method, apparatuses, and non-transitory computer-readable medium described herein, the one or more transport blocks includes a set of multiple instances of a first transport block, a first one or more instances of the set of multiple instances of the first transport block may be encoded using a first modulation and coding scheme, and a second one or more instances of the set of multiple instances may be encoded using a second modulation and coding scheme that may be different from the first modulation and coding scheme.

In some examples of the method, apparatuses, and non-transitory computer-readable medium described herein, the one or more transport blocks includes a set of multiple instances of a first transport block and an initial instance of the set of multiple instances of the first transport block may be encoded with a higher modulation and coding scheme than subsequent instances of the set of multiple instances of the first transport block.

Some examples of the method, apparatuses, and non-transitory computer-readable medium described herein may further include operations, features, means, or instructions for entering a low power state based on a successful decode of an initial instance of a set of multiple instances of a first transport block, where the first network node may be configured to not decode subsequent instances of the set of multiple instances of the first transport block due to the low power state.

Some examples of the method, apparatuses, and non-transitory computer-readable medium described herein may further include operations, features, means, or instructions for transmitting feedback information that indicates a respective acknowledgment or a respective negative acknowledgment for the one or more transport blocks on a per-transport block basis.

Some examples of the method, apparatuses, and non-transitory computer-readable medium described herein may further include operations, features, means, or instructions for transmitting feedback information that indicates bundled acknowledgment or bundled negative acknowledgment for a portion of the one or more transport blocks, where each transport block of the portion may have a same radio network temporary identifier.

Some examples of the method, apparatuses, and non-transitory computer-readable medium described herein may further include operations, features, means, or instructions for transmitting first feedback information only if a non-receipt of at least one of the one or more transport blocks occurs.

Some examples of the method, apparatuses, and non-transitory computer-readable medium described herein may further include operations, features, means, or instructions for transmitting second feedback information, based on transmission of the first feedback information, that indicates a respective acknowledgment or a respective negative acknowledgment for the one or more transport blocks on a per-transport block basis.

Some examples of the method, apparatuses, and non-transitory computer-readable medium described herein may further include operations, features, means, or instructions for receiving feedback scheme information that defines that the second feedback information may be acknowledgment-only, negative acknowledgment-only, or both.

Some examples of the method, apparatuses, and non-transitory computer-readable medium described herein may further include operations, features, means, or instructions for transmitting second control information that indicates a capability of the first network node to support the reception of the periodic multi-slot multi-cast transmissions.

Some examples of the method, apparatuses, and non-transitory computer-readable medium described herein may further include operations, features, means, or instructions for receiving second control information indicative of a second resource allocation for the reception of the periodic multi-slot multi-cast transmissions, where the second resource allocation includes a single reception occasion over a second set of multiple slots.

Some examples of the method, apparatuses, and non-transitory computer-readable medium described herein may further include operations, features, means, or instructions for receiving second control information indicative of a second resource allocation for the reception of periodic unicast transmissions, where the second resource allocation defines a second unicast reception period that may be repeated based on a second periodicity.

In some examples of the method, apparatuses, and non-transitory computer-readable medium described herein, the first control information may be indicative of a second resource allocation for the reception of the periodic multi-slot multi-cast transmissions and the second resource allocation includes a single reception occasion over a second set of multiple slots.

In some examples of the method, apparatuses, and non-transitory computer-readable medium described herein, the first control information may be indicative of a second resource allocation for the reception of periodic unicast transmissions.

In some examples of the method, apparatuses, and non-transitory computer-readable medium described herein, the first control information identifies a first quantity of the set of multiple slots, a second quantity of downlink shared channel occasions of the resource allocation, a third quantity of reception occasions in each slot of the set of multiple slots, or any combination thereof.

In some examples of the method, apparatuses, and non-transitory computer-readable medium described herein, the first quantity of the set of multiple slots, the second quantity of downlink shared channel occasions, or the third quantity of downlink shared channel occasions, or any combination thereof, may be based on a respective radio network temporary identifier.

A method of wireless communications performed by a first network node is described. The method may include transmitting first control information indicative of a resource allocation for reception of periodic multi-slot multi-cast transmissions, where the resource allocation includes a set of multiple reception occasions over a set of multiple slots and transmitting one or more transport blocks during the set of multiple reception occasions over the set of multiple slots.

An apparatus for wireless communications at a first network node is described. The apparatus may include a processor, memory coupled with the processor, and instructions stored in the memory. The instructions may be executable by the processor to cause the apparatus to transmit first control information indicative of a resource allocation for reception of periodic multi-slot multi-cast transmissions, where the resource allocation includes a set of multiple reception occasions over a set of multiple slots and transmit one or more transport blocks during the set of multiple reception occasions over the set of multiple slots.

Another apparatus for wireless communications at a first network node is described. The apparatus may include means for transmitting first control information indicative of a resource allocation for reception of periodic multi-slot multi-cast transmissions, where the resource allocation includes a set of multiple reception occasions over a set of multiple slots and means for transmitting one or more transport blocks during the set of multiple reception occasions over the set of multiple slots.

A non-transitory computer-readable medium having code for wireless communication at a first network node is described. The code may be executable transmit first control information indicative of a resource allocation for reception of periodic multi-slot multi-cast transmissions, where the resource allocation includes a set of multiple reception occasions over a set of multiple slots and transmit one or more transport blocks during the set of multiple reception occasions over the set of multiple slots.

Some examples of the method, apparatuses, and non-transitory computer-readable medium described herein may further include operations, features, means, or instructions for transmitting second control information configured to activate the resource allocation for the reception of the periodic multi-slot multi-cast transmissions based a radio network temporary identifier associated with group signaling.

In some examples of the method, apparatuses, and non-transitory computer-readable medium described herein, the one or more transport blocks includes an initial instance of a first transport block and one or more additional instances of the first transport block.

Some examples of the method, apparatuses, and non-transitory computer-readable medium described herein may further include operations, features, means, or instructions for receiving a negative acknowledgement, where the negative acknowledgment may be indicative of non-receipt of an initial instance of a first transport block of the one or more transport blocks during a first reception occasion, where the one or more transport blocks includes one or more retransmissions of the first transport block during additional reception occasions that may be subsequent to the first reception occasion.

In some examples of the method, apparatuses, and non-transitory computer-readable medium described herein, the one or more transport blocks includes a set of multiple instances of a first transport block, a first one or more instances of the set of multiple instances of the first transport block may be encoded using a first modulation and coding scheme, and a second one or more instances of the set of multiple instances may be encoded using a second modulation and coding scheme that may be different from the first modulation and coding scheme.

Some examples of the method, apparatuses, and non-transitory computer-readable medium described herein may further include operations, features, means, or instructions for receiving feedback information that indicates a respective acknowledgment or a respective negative acknowledgment for the one or more transport blocks on a per-transport block basis.

Some examples of the method, apparatuses, and non-transitory computer-readable medium described herein may further include operations, features, means, or instructions for receiving second control information that indicates a capability of a second network node to support the reception of the periodic multi-slot multi-cast transmissions.

DETAILED DESCRIPTION

Some wireless communications systems may have bursty traffic, where signaling has bursts (e.g., groups) of packets that may result in wireless channels being more occupied during the bursts. For example, virtual reality (VR) or extended reality (XR) signaling may have bursty traffic that is quasi-periodic, where packets may be communicated to provide 60 frames-per-second or 120 frames-per-second for VR or XR applications. Devices in the wireless communications system using the VR or XR applications may be configured with resources for configured scheduling, such as semi-persistent scheduling (SPS) for downlink signaling or configured grant (CG) for uplink signaling, which may provide periodic resources for communicating multiple packets for VR or XR applications. As the use and utility of XR applications grows, XR may be implemented in broadcast scenarios, where bursts of packets may be quasi-periodically transmitted to multiple users. However, some systems only support configuring unicast SPS resources with multiple resource occasions.

The present disclosure provides techniques for multi-cast SPS with multi-slot physical downlink shared channel (PDSCH) occasions in a single SPS period. In some aspects, multi-cast SPS with multi-slot PDSCH may be configured separately from unicast SPS and separately from multi-cast SPS with a single PDSCH occasion. In some other aspects, multi-cast SPS with multi-slot PDSCH may be configured via a same control signaling as other multi-cast SPS configurations, but the control signaling may indicate parameters to configure multiple PDSCH occasions. The reception occasions (e.g., PDSCH occasions) for the multi-cast SPS with multi-slot PDSCH occasions may be used for repetition of a transport block or retransmissions of a previously unsuccessfully decoded transport block. In some aspects, a network entity may encode transport blocks of the reception occasions with different modulation and coding schemes (MCS). In some aspects, a UE may provide acknowledgment or negative feedback for each reception occasion. In some other aspects, the UE may only provide feedback if the UE detects a negative acknowledgment for one or more of the transport blocks.

Aspects of the disclosure are initially described in the context of wireless communications systems. Aspects of the disclosure are further illustrated by and described with reference to apparatus diagrams, system diagrams, and flowcharts that relate to multi-cast multi-slot SPS communications.

Figure 1:
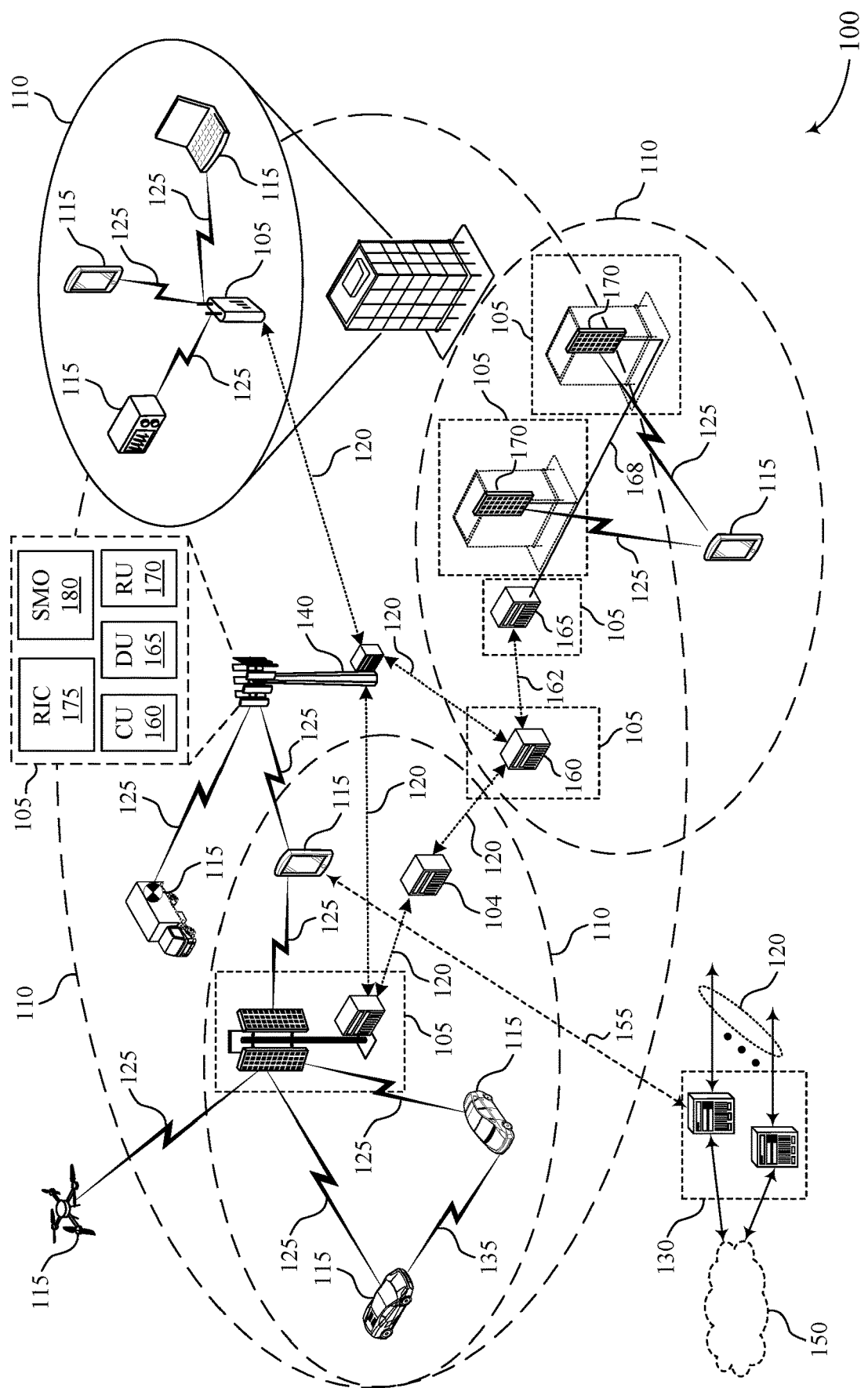
FIG. 1 shows an example of a wireless communications system that supports multi-cast multi-slot semi-persistent scheduling (SPS) communications in accordance with one or more aspects of the present disclosure.

FIG. 1 shows an example of a wireless communications system 100 that supports multi-cast multi-slot SPS communications in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an aspect of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another aspect, a network node may be a base station or network entity. As another aspect, a first network node may be configured to communicate with a second network node or a third network node. In one aspect of this aspect, the first network node may be a UE, the second network node may be a base station, and the third network node may be a UE. In another aspect of this aspect, the first network node may be a UE, the second network node may be a base station, and the third network node may be a base station. In yet other aspects of this aspect, the first, second, and third network nodes may be different relative to these aspects. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific aspect is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the aspect above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this aspect and consistent with this disclosure, disclosure that the first network node is configured to transmit information to the second network node includes disclosure that the first network node is configured to provide, send, output, communicate, or transmit information to the second network node. Similarly, in this aspect and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other aspects or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multi-cast multi-slot SPS communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other aspects, the device may provide HARQ feedback in a subsequent slot, or according to some other time interval.

The wireless communications system 100 may support XR signaling or applications. XR traffic may have bursty traffic, where bursts or groups of packets are transmitted together. In some aspects, the size of the packets may follow a Truncated Gaussian Distribution with a mean size of 500 kbits per frame. Some systems may use a single downlink control information (DCI) allocation or DCI activation to schedule multiple transport blocks across slots, providing consecutive or back-to-back allocations of traffic burst. For example, instead of a per-slot allocation, the DCI may be a one-shot allocation of a multi-slot, multi-transport block allocation to minimize PDCCH allocations.

In some cases, XR traffic may be quasi-periodic. For some XR applications, packets may arrive or be communicated to provide 60 frames-per-second or 120 frames-per-second for the XR application. For example, every 16.66 milliseconds, a new packet may arrive for the XR application. In some aspects, SPS and CG may provide consistent, periodic resources based on the quasi-periodic scheduling of XR applications.

XR applications may be used in various scenarios or implementations. For example, XR users may be using a cloud gaming application in close proximity. The XR users may have common update traffic coming every few milliseconds. In another aspect, a classroom may use an XR application for learning, where VR or XR class material is broadcasted to multiple students. The XR traffic may consist of bursts, such that multiple PDSCH occasions (e.g., multi-slot PDSCH) in a single SPS period is used to complete the transmission of a traffic burst. Additionally, in these scenarios, the traffic may be suitable for multi-cast signaling, where control or data signaling is common between the XR users with low latency, or in accordance with a low latency requirement.

Some systems may support multi-cast SPS signaling. For example, an SPS configuration in a multi-cast contention-free resource scheme may support one or multiple multi-cast SPS configurations per UE 115 based on a capability of the UE 115. In some aspects, a network entity 105 may encode a multicast SPS transmission (e.g., PDCCH or PDSCH transmission) with a group configured scheduling radio network temporary identifier (G-CS-RNTI). An association between a G-CS-RNTI and a multi-cast SPS configuration may be indicated by a HARQ process identifier field in an activation group common PDCCH (GC-PDCCH) with a same value provided by an SPS index of the multi-cast SPS configuration. In some aspects, multiple G-CS-RNTIs may not be mapped to the same multi-cast SPS configuration at the same time for a UE 115. In some aspects, a single multi-cast SPS configuration may be activated or deactivated by a GC-PDCCH with G-CS-RNTI. In some aspects, multi-cast SPS configurations configured in contention-free resources for multi-cast may not be activated by unicast PDCCH with CS-RNTI but may be deactivated by unicast PDCCH with CS-RNTI. In some aspects, a HARQ feedback mode and repetition number for SPS may be configured per-G-CS-RNTI. G-CS-RNTI may be used to scramble a PDSCH indicating a group-common SPS configuration and PDSCH messages that activate or deactivate group common SPS PDSCH configuration for one or more multi-cast broadband service (MBS) multi-cast services. However, these systems may not support multi-cast multi-slot SPS configurations with multiple PDSCH occasions within a single SPS period for a group of UEs 115.

The wireless communications system 100 may support HARQ feedback for multicast signaling. A network entity 105 may enable or disable HARQ feedback for multicast via RRC signaling or DCI. In some aspects, the network entity 105 may enable or disable HARQ feedback per G-RNTI or G-CS-RNTI using unicast RRC signaling. The function of enabling or disabling using DCI (e.g., format 4_2 DCI) with a G-RNTI or G-CS-RNTI may be configured by unicast RRC signaling.

In some aspects, the wireless communications system 100 may support two feedback modes for multicast signaling. For example, the wireless communications system 100 may support acknowledgment (ACK)/negative acknowledgment (NACK)-based feedback and NACK only-based HARQ feedback. For multicast SPS, a UE 115 may use ACK/NACK-based HARQ feedback for SPS activation and deactivation. For SPS multi-cast PDSCH signaling (e.g., without an associated scheduling PDCCH), the feedback mode may be configured per G-CS-RNTI via unicast RRC signaling. For example, the network entity 105 may configure UEs 115 associated with a multi-cast SPS configuration to use ACK/NACK-based feedback or NACK only-based feedback via RRC signaling, where the RRC signaling indicates a G-CS-RNTI associated with the multi-cast SPS configuration.

In some aspects, one or more physical uplink control channel (PUCCH) formats for uplink control information may be used for NACK-only HARQ feedback. For example, PUCCH format 0 or PUCCH format 1 with a cyclic shift of 0 may be used for NACK-only HARQ feedback for multi-cast signaling. A network entity 105 may configure PUCCH resource per-UE 115 for HARQ feedback of multicast signaling, and a PUCCH resource configuration for the HARQ feedback may be separate from a PUCCH resource configuration for unicast feedback or unicast signaling. In some aspects, PUCCH resources for NACK-only HARQ feedback may be shared by UEs 115 transmitting NACK-only HARQ feedback. When PUCCH resources for NACK-only HARQ feedback of a UE 115 collides with unicast PUCCH (e.g., for HARQ feedback or CSI) or unicast PUSCH for the same priority, the UE 115 may multiplex the NACK-only feedback in the PUCCH or PUSCH by transforming the NACK-only feedback into ACK/NACK HARQ feedback. If more than one NACK-only based feedback is available for transmission in the same PUCCH slot, the UE 115 may multiplex HARQ-ACK bits by transforming NACK-only information into ACK/NACK HARQ bits (e.g., if a more than one NACK-only mode is not configured). Otherwise, the UE 115 may use orthogonal PUCCH resources to select according to combinations of transport blocks with NACK-only feedback. For example, the UE 115 may use up to 15 orthogonal PUCCH resources to select from according to combinations of up to 4 transport blocks with NACK-only feedback.

The wireless communications system 100 may support techniques for a multi-cast, multi-slot SPS configuration. For example, a network entity 105 may configure a UE 115 with resources for multi-cast SPS with multiple PDSCH occasions in a single SPS period. For example, the network entity 105 may configure the UE 115 with a multi-slot SPS configuration with multiple group-cast PDSCH occasions, or resource allocations, within a single SPS period, or single SPS occasion. In some aspects, the PDSCH occasions may be used for repetition. For example, multiple instances or repetitions of a transport block may be transmitted using different PDSCH occasions within an SPS period. In some aspects, the network entity 105 may configure or indicate a pattern or interleaving of the repetitions across the PDSCH occasions. Additionally, or alternatively, the PDSCH occasions of an SPS occasion may be used for retransmission of PDSCHs that were indicated as unsuccessfully received (e.g., via NACK feedback) by one or more of the UEs receiving the groupcast or multi-cast transmissions.

In some aspects, the network entity 105 may use different MCS indexes for different transport blocks or different PDSCH occasions. For example, the network entity 105 may transmit a first transport block in a first PDSCH occasion of an SPS with a high MCS, while a last transport block in a last PDSCH occasion of the SPS period is transmitted with a low MCS. In some aspects, the wireless communications system 100 may support one or more modes of HARQ feedback for the multi-cast SPS configuration with multi-slot PDSCH. For example, a UE 115 may provide HARQ feedback for each PDSCH occasion, or the UE 115 may only provide HARQ feedback if the UE 115 detects a NACK for one or more PDSCH occasions during the SPS period.

Figure 2:
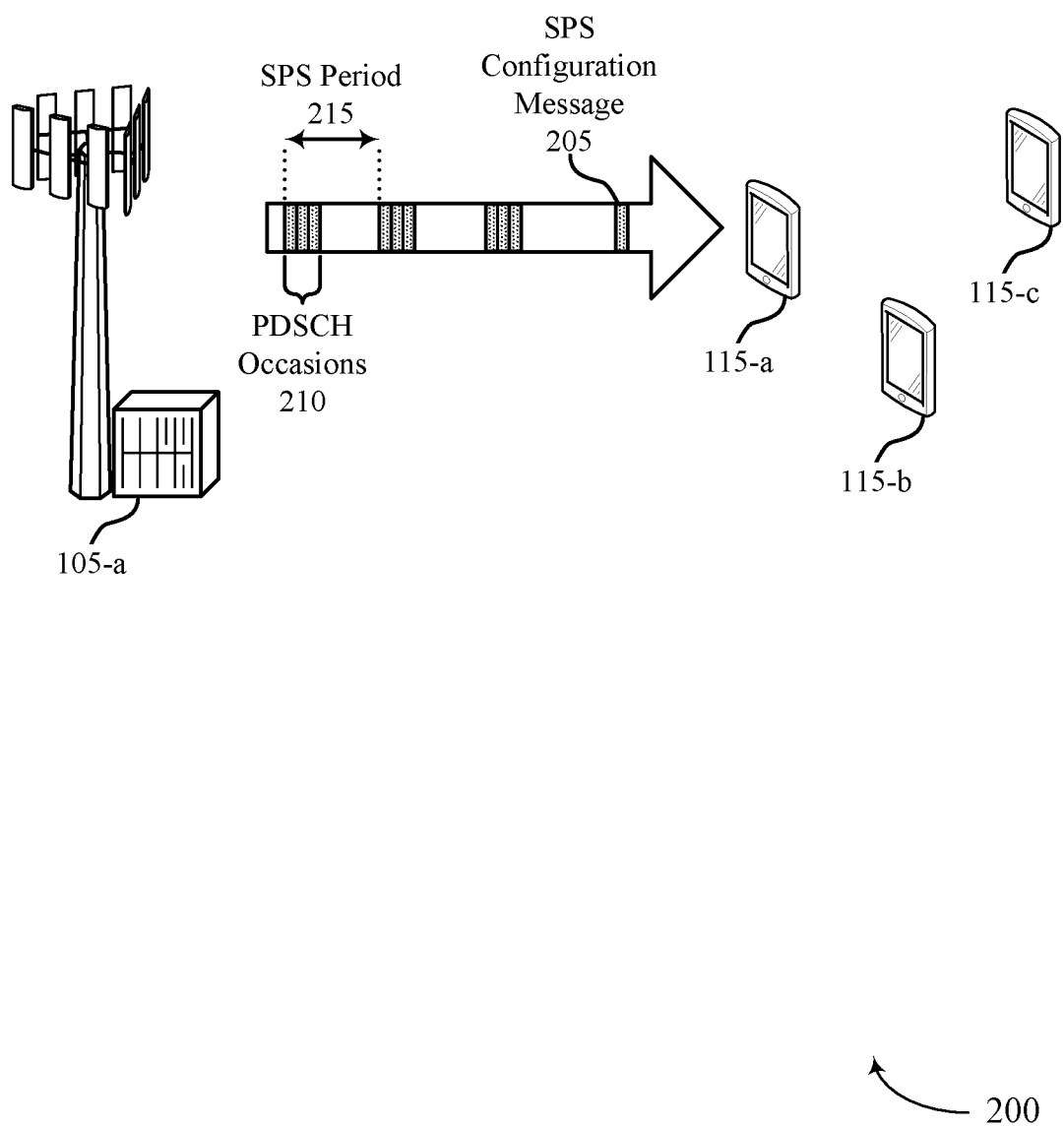
FIG. 2 shows an example of a wireless communications system that supports multi-cast multi-slot SPS communications in accordance with one or more aspects of the present disclosure.

FIG. 2 shows an example of a wireless communications system 200 that supports multi-cast multi-slot SPS communications in accordance with one or more aspects of the present disclosure. The wireless communications system 200 may implement aspects of the wireless communications system 100. The wireless communications system 200 may include a UE 115-*a*, a UE 115-*b*, and a UE 115-*c*, each of which may be an aspect of a UE 115 as described with reference to FIG. 1. The wireless communications system 200 may include a network entity 105-*a*, which may be an aspect of a network entity 105 as described with reference to FIG. 1. In some aspects, the UEs 115 and the network entity 105-*b* may each be a respective example of a network node.

The wireless communications system 200 may support XR signaling or applications. In some aspects, the network entity 105-*a* may transmit XR packets to one or more UEs 115, such as the UE 115-*a*, the UE 115-*b*, and the UE 115-*c*. XR traffic may have bursty and quasi-periodic traffic, as the network entity 105-*a* may transmit bursts or groups of packets to provide, for example, 60 frames-per-second or 120 frames-per-second for an XR application.

The network entity 105-*a* may configure the one or more UEs 115 with multi-cast SPS resources with multi-slot PDSCH. For example, the network entity 105-*a* may transmit an SPS configuration message 205 to configure the UE 115-*a*, the UE 115-*b*, and the UE 115-*c* with a resource allocation for reception of periodic multi-cast transmissions. The resource allocation may include multiple reception occasions, such as PDSCH occasions 210, over multiple slots and within an SPS period 215. The signaling may be groupcast or multi-cast, where the network entity 105-*a* may transmit the same transport blocks to multiple UEs 115 (e.g., the UE 115-*a*, the UE 115-*b*, and the UE 115-*c*) using the PDSCH occasions 210. In some aspects, a multi-cast SPS configuration with multiple reception occasions (e.g., for PDSCH signaling) may be referred to as a multi-cast, multi-slot SPS configuration.

In some aspects, a UE 115 may be configured with multi-cast SPS with multiple PDSCH occasions in a single SPS period separately from being configured with an SPS configuration for unicast. In some aspects, the PDSCH occasions 210 may include aspects of group common PDSCH (GC-PDSCH) occasions. For example, the SPS configuration message 205 may configure the UE 115-*a* for multi-cast SPS with multi-slot PDSCH, and separate signaling may configure the UE 115-*a* for unicast SPS. Additionally, or alternatively, the UE 115 may be configured with multi-cast SPS with multi-slot PDSCH separate from an SPS configuration for multicast without multiple PDSCH occasions. For example, the SPS configuration message 205 may configure the UE 115-*a* for multi-cast SPS with multi-slot PDSCH, and separate signaling may configure the UE 115-*a* for other multicast SPS (e.g., a multi-cast SPS configuration with a single PDSCH occasion).

In some aspects, the network entity 105-*a* may transmit the SPS configuration message 205 to configure an SPS configuration for multi-cast, and parameters of the SPS configuration may indicate whether the SPS configuration has multiple PDSCH resources per SPS occasion or a single PDSCH resource per SPS occasion. For example, the SPS configuration message 205 may configure either multi-cast SPS with a single PDSCH occasion or multi-cast SPS with multiple PDSCH occasions.

For example, in some aspects, the SPS configuration message 205 may indicate a quantity of allocated slots in a semi-persistent periodicity following a time instance of an SPS offset. The quantity of allocated slots may be indicated via a parameter such as "sps-nrofSlots." Additionally, or alternatively, the SPS configuration message 205 may indicate a quantity of consecutive PDSCH resources configured for SPS within a slot. The quantity of consecutive PDSCH resources or occasions may be indicated via a parameter such as "sps-nrofPDSCH-InSlot." In some aspects, the network entity 105 may configure separate quantities of PDSCH per slot for different RNTIs. For example, the quantity of consecutive PDSCH configured for SPS within a slot may be configured per G-CS-RNTI. In some aspects, a different G-CS-RNTI may use, or be associated with, a same SPS configuration but different multi-PDSCH configurations. In some aspects, this may provide flexibility for providing SPS configurations, as a total quantity of SPS configurations at a UE 115 or a network entity 105, or both, may be limited. If the SPS configuration indicates the parameters for the quantity of allocated slots and the quantity of consecutive PDSCH, and the UE 115 is configured with group CS-RNTI, then the SPS configuration may use multi-cast, multi-slot PDSCH signaling.

In some aspects, one or more of the PDSCH occasions 210 may be used for repetition. For example, the network entity 105-*a* configure the PDSCH occasions 210 to be used for repetition of GC-PDSCH signaling. In some aspects, the network entity 105-*a* may configure a repetition quantity, repK, which may correspond to a quantity of instances or repetitions of a transport block in an SPS occasion. In some aspects, the network entity 105-*a* may interleave repetitions with initial transmissions. In some aspects, the network entity 105-*a* may configure or indicate the interleaving or pattern for the initial transmissions and repetitions.

UEs 115 may have different coverage and therefore different decoding efficiencies or likelihoods. For example, the UE 115-*a* may have better quality coverage than the UE 115-*b*, so the UE 115-*a* may decode a transport block using fewer repetitions or instances of the transport block than the UE 115-*b*. In some aspects, the network entity 105-*a* may encode transport blocks with different MCSs and transmit the transport blocks encoded with the different MCSs using the PDSCH occasions 210 of the SPS period 215. For example, the network entity 105-*a* may transmit a first instance of a transport block encoded using a high MCS and a second instance of the transport block encoded using a low MCS. The UE 115-*a* may successfully decode the transport block after receiving the first instance of the transport block encoded using the high MCS, and the UE 115-*a* may enter a low power state or go to sleep. The UE 115-*b* may receive the first instance of the transport block and the second instance of the transport block to successfully decode the transport block. In some aspects, the wireless communications system 200 may support repetition or using different MCS for transmission of a transport block in a multi-cast, multi-slot SPS configuration instead of dimensioning for a low MCS scenario, such that UEs 115 with good coverage can decode faster and go to sleep, saving power.

The wireless communications system 200 may support one or more feedback modes or schemes for multi-cast, multi-slot SPS. In some aspects, when multi-slot multi-cast SPS configuration is activated or deactivated at a UE 115, the UE 115 may continue to use ACK/NACK-based HARQ feedback. In some aspects, a UE 115 providing individual ACK/NACK feedback for each transport block may be referred to as a first mode of feedback or a first mode of HARQ feedback for multi-cast, multi-slot SPS communications. For example, the UE 115 may provide feedback per transport block for each multi-slot PDSCH occasion in the SPS period 215. In some aspects, the UE 115 may use group bundling to reduce overhead of the feedback. For example, the UE 115 may transmit a single message that indicates feedback for multiple transport blocks or multiple PDSCH occasions, or both. In some aspects, the UE 115 may bundle feedback for transport blocks that are associated with, or encoded by, a same G-CS-RNTI.

Additionally, or alternatively, a UE 115 may only provide feedback when the UE 115 detects non-receipt or a negative acknowledgment for one or more of the transport blocks. For example, the UE 115 may implement a NACK-only feedback mode, where the UE 115 transmits a feedback message when the UE 115 detects a non-receipt or a NACK for at least one transport block. In some aspects, the NACK-only feedback mode may be referred to as a second mode of feedback or a second mode of HARQ feedback for multicast, multi-slot SPS communications. In some aspects, the second mode of feedback may be referred to or based on a more-than-one NACK feedback scheme or mode. If the UE 115 successfully receives and decodes each transport block, or each unique transport block in case of repetition, the UE 115 may not transmit a feedback message. If the network entity 105-a does not receive a feedback message, the network entity 105-a may identify that the UE 115 successfully received each transport block. However, if the UE 115 does not receive or decode one or more transport blocks, the UE 115 may transmit a feedback message. In some aspects, the UE 115 may report per-PDSCH occasion acknowledgments or per-transport block acknowledgments. For example, if the UE 115 does not receive a second transport block of, for example, five transmitted transport blocks in the SPS period 215, the UE 115 may transmit the feedback message indicating an acknowledgment for a first, third, fourth, and fifth transport block and a negative acknowledgment for the second transport block. In some aspects, the UE 115 may indicate both acknowledgments and negative acknowledgments for each transport block or each PDSCH occasion, or the UE 115 may only indicate negative acknowledgments for transport blocks or PDSCH occasions which were not received or unsuccessfully decoded. In some cases, without indicating which transport blocks or PDSCH occasions were successfully received or unsuccessfully received, the network entity 105-a may not be able to identify which transport blocks are to be retransmitted.

In some aspects, for the second mode of feedback, the UE 115 may be configured to report either only negative acknowledgments or both acknowledgments and negative acknowledgments based on a configuration from the network entity 105-a. For example, the network entity 105-a may configure the UE 115 to report either ACK/NACK feedback or only negative acknowledgments via L1, Layer 2 (L2), or Layer 3 (L3) signaling (e.g., through L1, L2, or L3 configuration). In some aspects, the network entity 105-a may configure the UE 115 to treat all PDSCH occasions of a same SPS occasion (e.g., the SPS period 215) as one group. For example, if the UE 115 detects a NACK for a PDSCH occasion or transport block in the SPS occasion, the UE 115 may identify the SPS occasion as unsuccessfully received, and the UE 115 may report individual ACK/NACK feedback or NACK feedback for each transport block or PDSCH occasion, or both, of the SPS occasion.

In some aspects, whether multi-cast SPS with multi-slot PDSCH is supported may be configurable by the network (e.g., the network entity 105-a) and be based on UE capability. For example, the UE 115-a, the UE 115-b, and the UE 115-c may each report respective UE capabilities, indicating that each of the UEs 115 supports multi-cast SPS with multi-slot PDSCH. The network entity 105-a may transmit control signaling to configure the UEs 115 with a multi-cast SPS configuration with multi-slot PDSCH based on the capabilities of the UEs 115.

While the techniques for multi-cast, multi-slot SPS communications are described in the context of configured scheduling such as SPS signaling, these techniques may also be applied for signaling scheduled by a dynamic grant. For example, a network entity 105-a may transmit a dynamic grant to one or more UEs 115 to schedule resources for a multi-cast, multi-slot transmission. In some aspects, the dynamic grant may indicate a quantity of allocated slots or a quantity of consecutive PDSCH occasions within the schedule resources. Additionally, or alternatively, the UEs 115 dynamically scheduled for the multi-cast, multi-slot transmissions may transmit feedback in accordance with the first mode of feedback or the second mode of feedback, or both.

Figure 3:
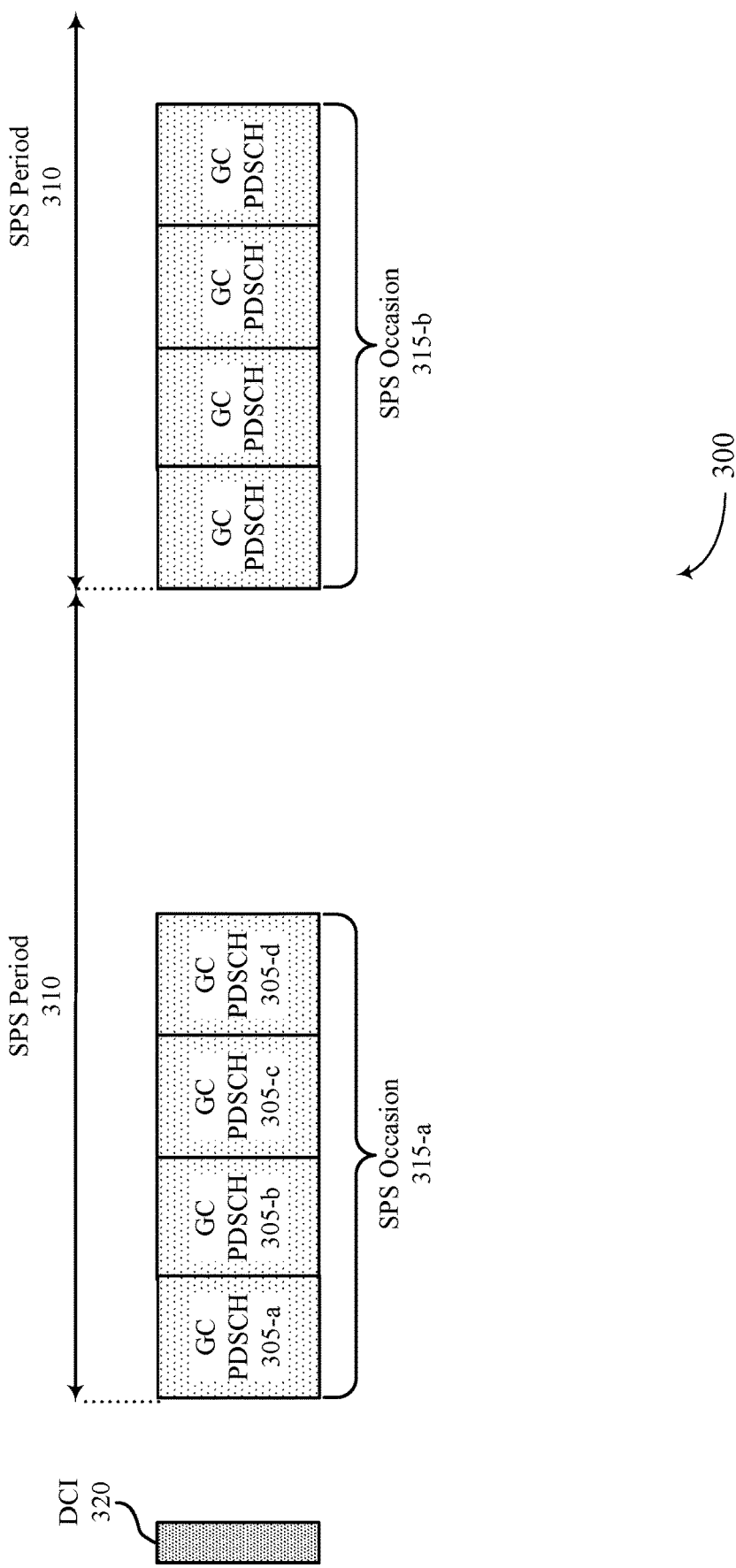
FIG. 3 shows an example of a multi-cast multi-slot SPS occasion that supports multi-cast multi-slot SPS communications in accordance with one or more aspects of the present disclosure.

FIG. 3 shows an example of a multi-cast, multi-slot SPS occasion 300 that supports multi-cast multi-slot SPS communications in accordance with one or more aspects of the present disclosure.

A network entity 105 may transmit control information to configure multiple UEs 115 with a multi-cast, multi-slot SPS configuration. For example, the UEs 115 may be configured with for multi-cast SPS signaling with multi-slot PDSCH. The multi-cast, multi-slot SPS occasion 300 shows an example of four GC-PDSCH occasions within a single SPS occasion of an SPS period. For example, an SPS occasion 315-a within the SPS period 310 may include four separate GC-PDSCH occasions, including GC-PDSCH 305-a, GC-PDSCH 305-b, GC-PDSCH 305-c, and GC-PDSCH 305-d. The SPS occasions 315 may occur at a periodicity based on the SPS period 310. For example, during a following SPS period, there may be another SPS occasion (e.g., an SPS occasion 315-b in a next period of the SPS period 310) with another four GC-PDSCH occasions 305. In some examples, the multi-cast, multi-slot SPS occasion 300 may support inter-slot or intra-slot resource occasions. For example, a PDSCH occasion may span one slot or multiple slots, or a single slot may include multiple PDSCH occasion.

In some aspects, the network entity 105 may configure the multi-slot, multi-PDSCH SPS configuration via control signaling such as RRC signaling. In some aspects, the multi-slot, multi-PDSCH SPS configuration may be separate from, or configured separately from, a unicast SPS configuration or a multi-cast SPS configuration which does not have multiple PDSCH occasions.

In some other aspects, the same signaling may be used to configure a multi-cast SPS configuration with one PDSCH occasion or multiple PDSCH occasions. For example, one or more parameters of the multi-cast SPS configuration may indicate whether the multi-cast SPS configuration includes multiple PDSCH occasions or a single PDSCH occasions. For example, the network entity 105 may configure multiple PDSCH configuration in the SPS configuration. In some aspects, the parameters may indicate a quantity of allocated slots in a semi-persistent periodicity following a time instance of an SPS offset. In some aspects, the parameters may indicate a quantity of consecutive PDSCH configured to SPS within a slot.

In some aspects, the network entity 105 may transmit a control message, such as DCI 320, to activate, enable, or disable the SPS configuration. For example, the DCI 320 may activate a multi-cast SPS configuration with multi-slot PDSCH. In some aspects, the DCI 320 may be transmitted to multiple UEs 115 to activate, enable, or disable the multi-cast SPS configuration with multi-slot PDSCH at each of the multiple UEs 115. In some aspects, the DCI 320 may activate, enable, or disable, multiple multi-cast SPS configurations with multi-slot PDSCH.

In some aspects, the PDSCH occasions may be used for repetition of one or more transport blocks. The network entity 105 may configure a repetition factor, repK, to use the PDSCH occasions for repetition of GC-PDSCH transmissions. In some aspects, repetitions of a transport block may be interleaved with initial transmissions of the transport block. For example, the network entity 105-*a* may transmit an initial transmission of a first transport block via GC-PDSCH 305-*a* and a repetition of the first transport block via GC-PDSCH 305-*b*, and the network entity 105-*a* may transmit an initial transmission of a second transport block via GC-PDSCH 305-*c* and a repetition of the second transport block via GC-PDSCH 305-*d*. In this example, the second and fourth PDSCH occasion of the SPS occasion 315-*a*He g In some aspects, the network entity 105-*a* may transmit an initial transmission of a first transport block via GC-PDSCH 305-*a* and an initial transmission of a second transport block via GC-PDSCH 305-*b*, and the network entity 105-*a* may transmit a repetition of the first transport block via GC-PDSCH 305-*c* and a repetition of the second transport block via GC-PDSCH 305-*d*. In some aspects, the network entity 105-*a* may indicate a pattern of how the repetitions and initial transmissions are interleaved.

In some aspects, the reception occasions of an SPS occasion may be used for retransmission of transport blocks. For example, the network entity 105 may transmit an initial instance of a transport block in a GC-PDSCH 305 in the SPS occasion 315-*a* and transmit a retransmission of the transport block in a later GC-PDSCH in the SPS occasion 315-*b*. For example, the PDSCH occasions of a single SPS occasion 315 may be used for retransmission of PDSCHs that were indicated as NACK in a previous SPS occasion. In some aspects, the occasions carrying retransmissions may be skipped by UEs 115 which did not report a NACK for the retransmitted transport block.

In some aspects, the network entity 105 may encode the transport blocks using different MCSs. For example, the network entity 105 may encode an initial instance of a first transport block using a high MCS and transmit the initial instance of the first transport block via GC-PDSCH 305-*a*. The network entity 105 may encode a repetition of the first transport block using a low MCS and transmit the repetition of the first transport block via GC-PDSCH 305-*b*. A first UE 115 with good coverage may decode the initial instance of the first transport block via GC-PDSCH 305-*a* and successfully decode the first transport block. The UE 115 with good coverage may then go to sleep or enter a low power state. A second UE 115 with worse coverage or poor channel conditions may decode both the initial instance of the first transport block via GC-PDSCH 305-*a* and the repetition of the first transport block via GC-PDSCH 305-*b*. In some aspects, instead of dimensioning for the low MCS case, the first UE 115 in good coverage may decode faster and go to sleep to save power.

UEs 115 configured for the multi-cast SPS configuration with multi-slot PDSCH may provide feedback in accordance with a first mode or a second mode. In the first mode, a UE 115 may provide ACK/NACK feedback for each transport block of the multi-slot PDSCHs in the SPS occasion 315-*a*. For example, a UE 115 may provide individual acknowledgment feedback for transport blocks received via the GC-PDSCHs 305. If, for example, the UE 115 successfully received all of the transport blocks, the UE 115 may transmit a feedback message indicating an acknowledgment for each transport block or each GC-PDSCH 305 in the SPS occasion 315-*a*. If a second transport block is not received or successfully decoded, but each other transport block is successfully received and decoded, the UE 115 may transmit the feedback message indicating a negative acknowledgment for the second transport block and an acknowledgment for each other transport block.

In the second mode, a UE 115 may only transmit a feedback message if the UE 115 detects non-receipt of one or more transport blocks. For example, if the UE 115 successfully receives or decodes each transport block or GC-PDSCH 305 in the SPS occasion 315, the UE 115 may not transmit a feedback message. If one or more transport blocks are unsuccessfully received or decoded, the UE 115 may transmit a feedback message indicating acknowledgment feedback for the transport blocks or GC-PDSCHs 305, or both. For example, if the UE 115 detects non-receipt of a third transport block but successfully receives each other transport bloc, the UE 115 may transmit a feedback message indicating that the third transport block was not received. In some aspects, the UE 115 may additionally, or alternatively, indicate that the other transport blocks were successfully received.

While the example of the multi-cast, multi-slot SPS occasion 300 is described with reference to an SPS configuration, similar techniques may be implemented for a single or dynamic DCI which schedules multiple PDSCH occasions. For example, the DCI 320 may be an example of a dynamic DCI which schedules multiple PDSCH occasions for multiple UEs 115. The multiple PDSCH occasions scheduled by the DCI may similarly be used for repetition of one or more transport blocks, retransmission of transport blocks, or both. In some examples, the UEs 115 scheduled for multi-slot, multi-cast signaling via a dynamic DCI may implement the first feedback mode or the second feedback mode to provide feedback for transport blocks received via the multi-slot, multi-cast signaling.

Figure 4:
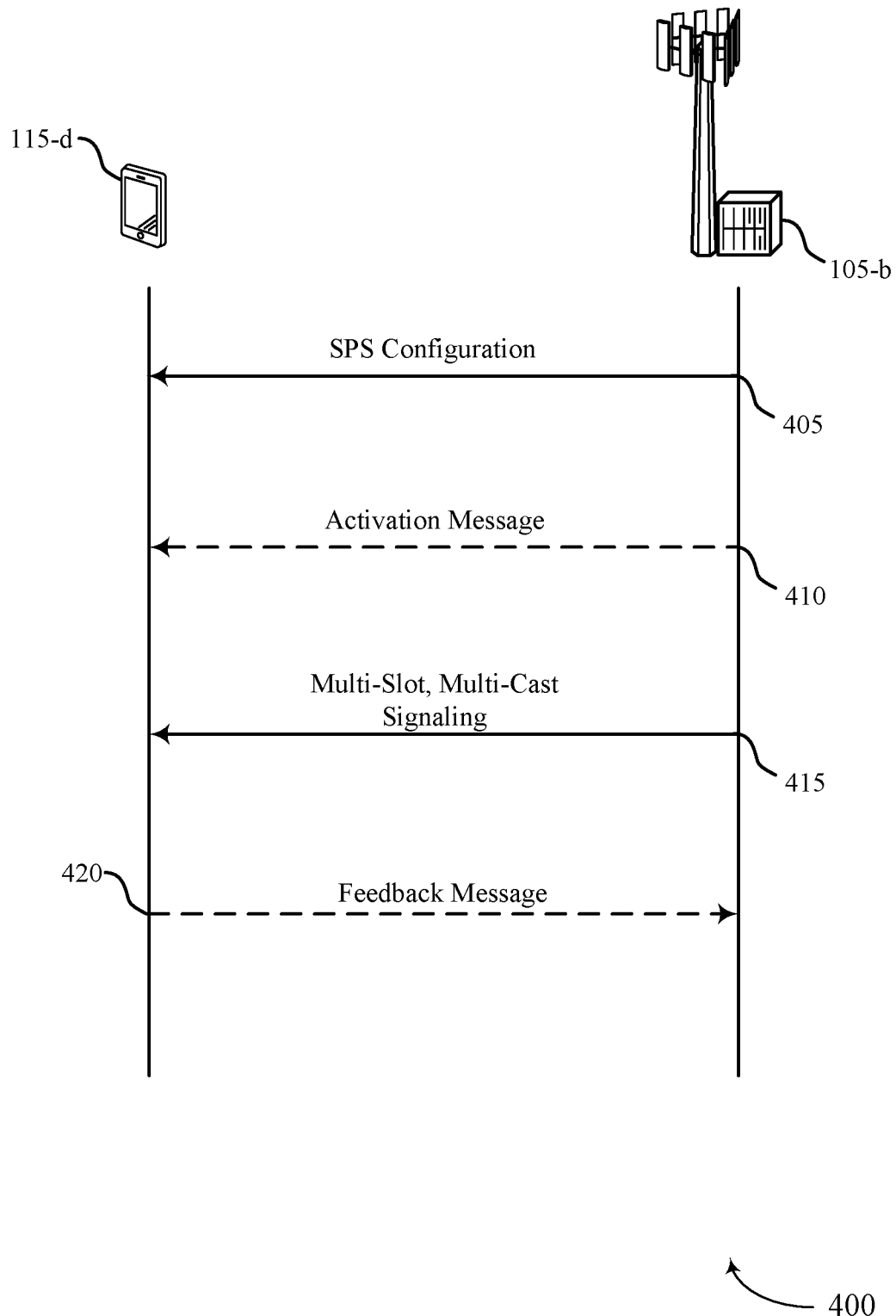
FIG. 4 shows an example of a process flow that supports multi-cast multi-slot SPS communications in accordance with one or more aspects of the present disclosure.

FIG. 4 shows an example of a process flow 400 that supports multi-cast multi-slot SPS communications in accordance with one or more aspects of the present disclosure. The process flow 400 may be implemented by a UE 115-*d* or a network entity 105-*b*, or both, which may be respective examples of a UE 115 and a network entity 105 as described with reference to FIGS. 1 and 2. In some aspects, the UE 115-*d* and the network entity 105-*b* may each be an example of a network node.

In the following description of the process flow 400, the operations between the UE 115-*d* and the network entity 105-*b* may be transmitted in a different order than the exemplary order shown, or the operations performed by UE 115-*d* and the network entity 105-*b* may be performed in different orders or at different times. Certain operations may also be left out of the process flow 400, or other operations may be added to the process flow 400.

At 405, the network entity 105-*b* may transmit control signaling indicating a multi-cast SPS configuration with multi-slot PDSCH to one or more UEs 115, including the UE 115-*d*. For example, the UE 115-*d* may receive first control information indicative of a resource allocation for reception of periodic multi-slot, multi-cast transmissions. The resource allocation may include a set of multiple reception occasions over a set of multiple slots. In some aspects, the network entity 105-*b* may transmit the first control information via control signaling such as RRC signaling. In some aspects, a PDSCH occasion or a PDSCH reception occasion may be an example of the reception occasions included in the resource allocation. In some aspects, the resource allocation may be periodic. For example, the resource allocation may be configured to have a periodicity such as an SPS periodicity. In some aspects, the reception occasions may be inter-slot reception occasions or intra-slot reception occasions. For example, there may be one reception occasion per slot or multiple reception occasions per slot, or a reception occasion may span multiple slots.

In some aspects, at 410, the network entity 105-*b* may transmit a control message to activate or enable the multi-cast SPS configuration with multi-slot PDSCH. For example, the network entity 105-*b* may transmit DCI which activates or enables the multi-cast, multi-slot SPS configuration. In some aspects, the UE 115-*d* may receive second control information configured to activate the resource allocation for the reception of the periodic multi-slot multi-cast transmissions based on an RNTI associated with group signaling. For example, the DCI may be encoded using an RNTI associated with group signaling, such as a G-CS-RNTI, which may be associated with the SPS configuration.

At 415, the network entity 105-*b* may transmit multi-cast, multi-slot signaling to multiple UEs 115 configured with the multi-cast, multi-slot SPS configuration. For example, the UE 115-*d* may receive one or more transport blocks during the set of multiple reception occasions over the set of multiple slots. In some aspects, the reception occasions may be used for repetition of transport blocks. For example, the one or more transport blocks may include an initial instance of a first transport block and one or more additional instances of the first transport block. In some aspects, the one or more transport blocks may include one or more instances of a second transport block different from the first transport block, and an order within the set of multiple reception occasions of the initial instance of the first transport block, the one or more additional instances of the first transport block, and the one or more instances of the second transport block may be in accordance with an indicated order.

In some aspects, the UE 115-*d* may skip decoding repetitions or additional instances of a transport block if the UE 115-*d* decodes an earlier repetition or instance of the transport block. For example, the UE 115-*d* may skip, based on a successful decode of a first transport block received during a first reception occasion, monitoring for an additional one or more reception occasions that are subsequent to the first reception occasion. In some aspects, the additional one or more reception occasions are associated with respective retransmissions of the first transport block, and the one or more transport blocks include the first transport block.

In some aspects, the UE 115-*d* may transmit a feedback message to the network entity 105-*b* at 420. In some aspects, the UE 115-*d* may be configured for a first mode of feedback, where the UE 115-*d* provides feedback for each transport block. The UE 115-*d* may transmit feedback information that indicates a respective acknowledgment or a respective negative acknowledgment for the one or more transport blocks on a per-transport block basis.

In some aspects, the UE 115-*d* may be configured for a second mode of feedback, where the UE 115-*d* provides feedback only if the UE 115-*d* detects a negative acknowledgment or non-receipt of one or more transport blocks. For example, the UE 115-*d* may transmit first feedback information only if a non-receipt of at least one of the one or more transport blocks occurs. In some aspects, the UE 115-*d* may transmit second feedback information, based on transmission of the first feedback information, that indicates a respective acknowledgment or a respective negative acknowledgment for the one or more transport blocks on a per-transport block basis. In some aspects, the network entity 105-*b* may configure how the UE 115-*d* is to implement the second mode of feedback. For example, the UE 115-*d* may receive feedback scheme information that defines that the second feedback information is acknowledgment-only, negative acknowledgment-only, or both.

In some aspects, the UE 115-*d* may be configured with the multi-slot, multi-cast SPS configuration based on a capability of the UE 115-*d*. For example, the UE 115-*d* may transmit second control information that indicates a capability of the UE 115-*d* to support the reception of the periodic multi-slot multi-cast transmissions. The network entity 105-*b* may transmit the first control information that is indicative of the resource allocation based on the capability of the UE 115-*d*.

Figure 5:
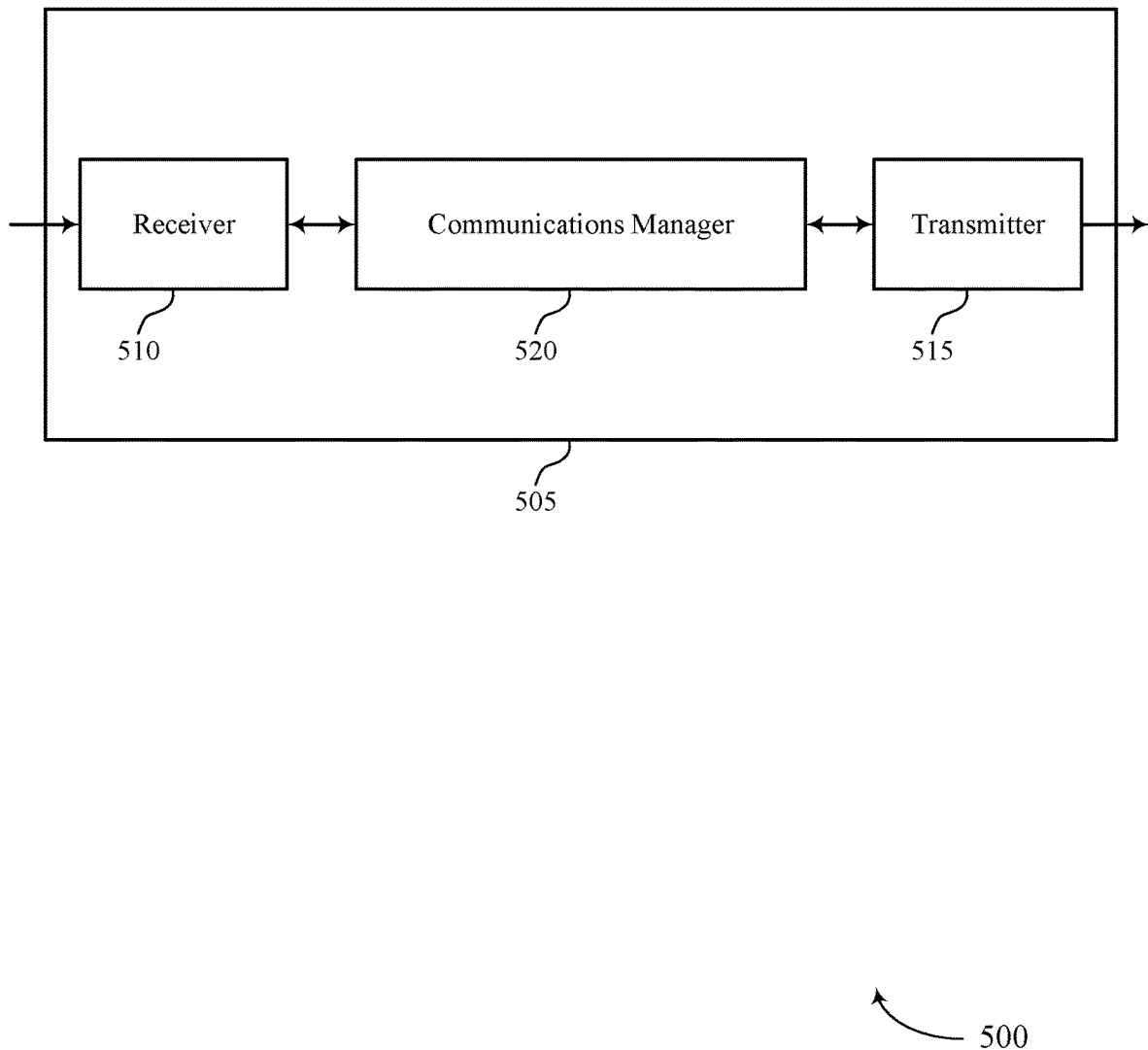
FIGS. 5 and 6 show block diagrams of devices that support multi-cast multi-slot SPS communications in accordance with one or more aspects of the present disclosure.

FIG. 5 shows a block diagram 500 of a device 505 that supports multi-cast multi-slot SPS communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multi-cast multi-slot SPS communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multi-cast multi-slot SPS communications). In some aspects, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of multi-cast multi-slot SPS communications as described herein. For example, the communications manager 520, the receiver 510, the transmitter 515, or various combinations or components thereof may support a method for performing one or more of the functions described herein.

In some aspects, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first network node in accordance with examples as disclosed herein. For example, the communications manager 520 is capable of, configured to, or operable to support a means for receiving first control information indicative of a resource allocation for reception of periodic multi-slot multi-cast transmissions, where the resource allocation includes a set of multiple reception occasions over a set of multiple slots. The communications manager 520 is capable of, configured to, or operable to support a means for receiving one or more transport blocks during the set of multiple reception occasions over the set of multiple slots.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources.

Figure 6:
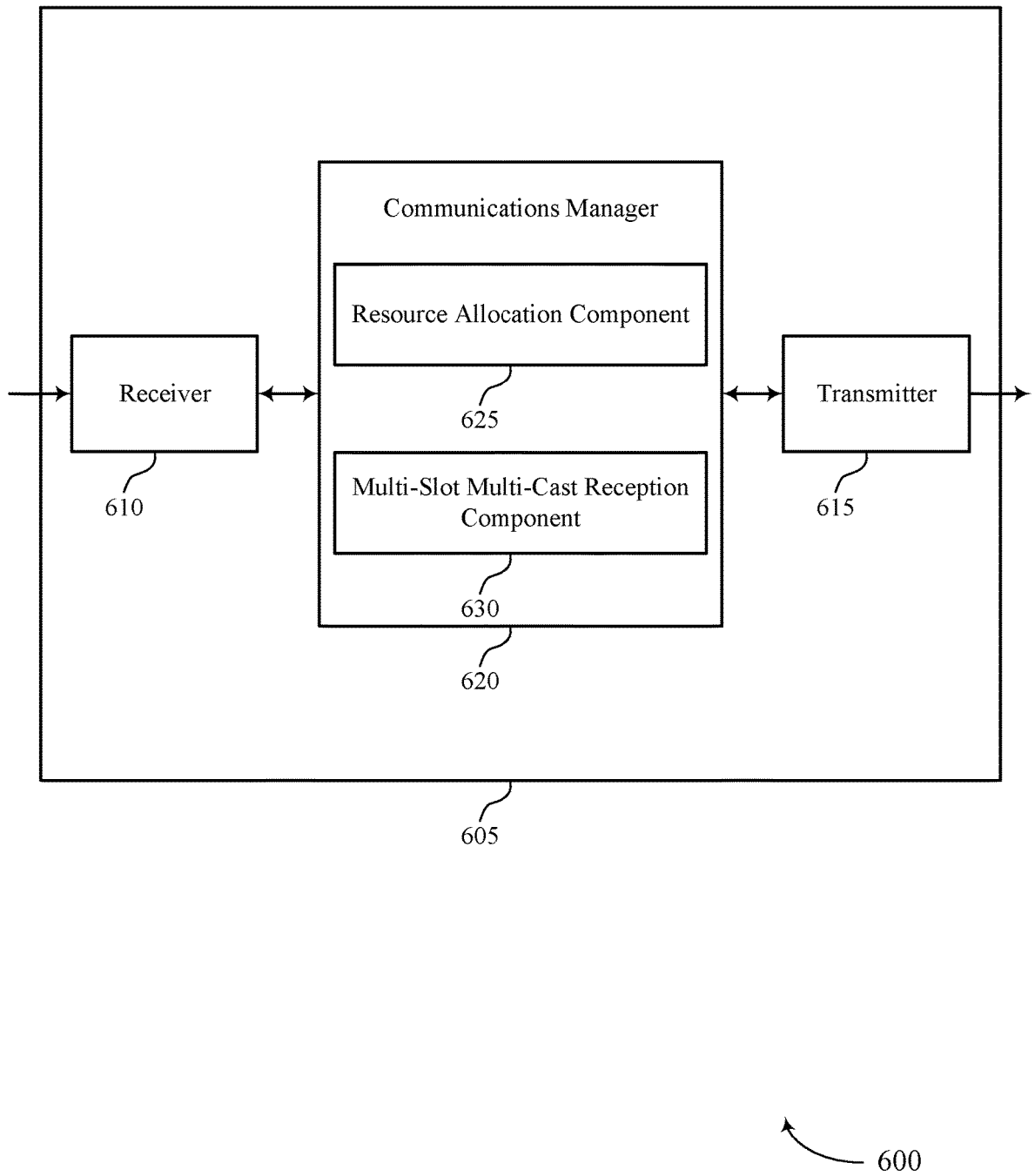

FIG. 6 shows a block diagram 600 of a device 605 that supports multi-cast multi-slot SPS communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multi-cast multi-slot SPS communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multi-cast multi-slot SPS communications). In some aspects, the transmitter 615 may be co-located with a receiver 610 in a transceiver module. The transmitter 615 may utilize a single antenna or a set of multiple antennas.

The device 605, or various components thereof, may be an example of means for performing various aspects of multi-cast multi-slot SPS communications as described herein. For example, the communications manager 620 may include a resource allocation component 625 a multi-slot multi-cast reception component 630, or any combination thereof. The communications manager 620 may be an example of aspects of a communications manager 520 as described herein. In some aspects, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first network node in accordance with examples as disclosed herein. The resource allocation component 625 is capable of, configured to, or operable to support a means for receiving first control information indicative of a resource allocation for reception of periodic multi-slot multi-cast transmissions, where the resource allocation includes a set of multiple reception occasions over a set of multiple slots. The multi-slot multi-cast reception component 630 is capable of, configured to, or operable to support a means for receiving one or more transport blocks during the set of multiple reception occasions over the set of multiple slots.

Figure 7:
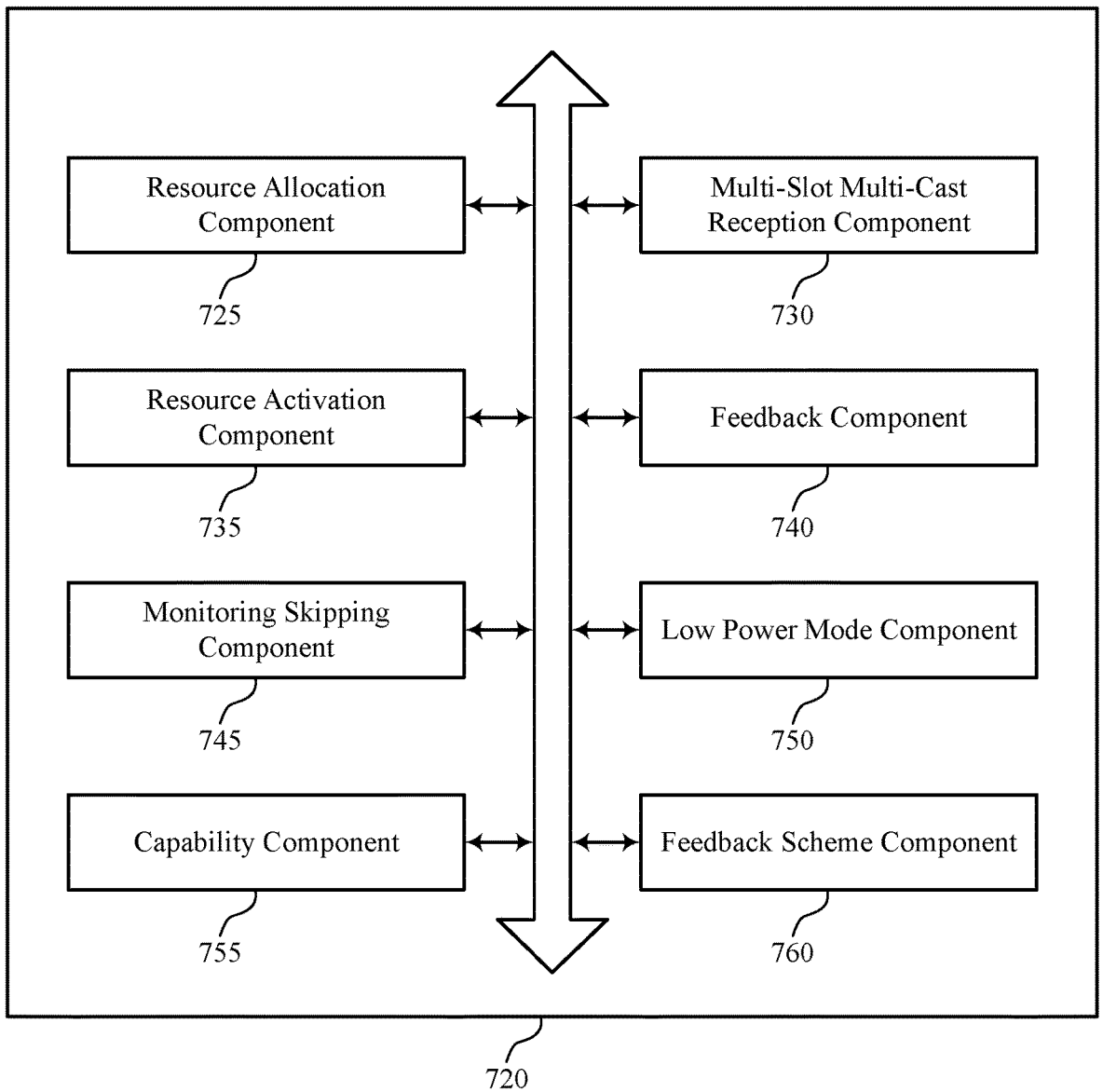
FIG. 7 shows a block diagram of a communications manager that supports multi-cast multi-slot SPS communications in accordance with one or more aspects of the present disclosure.

FIG. 7 shows a block diagram 700 of a communications manager 720 that supports multi-cast multi-slot SPS communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of multi-cast multi-slot SPS communications as described herein. For example, the communications manager 720 may include a resource allocation component 725, a multi-slot multi-cast reception component 730, a resource activation component 735, a feedback component 740, a monitoring skipping component 745, a low power mode component 750, a capability component 755, a feedback scheme component 760, or any combination thereof. Each of these components may communicate, directly or indirectly, with one another (e.g., via one or more buses).

The communications manager 720 may support wireless communication at a first network node in accordance with examples as disclosed herein. The resource allocation component 725 is capable of, configured to, or operable to support a means for receiving first control information indicative of a resource allocation for reception of periodic multi-slot multi-cast transmissions, where the resource allocation includes a set of multiple reception occasions over a set of multiple slots. The multi-slot multi-cast reception component 730 is capable of, configured to, or operable to support a means for receiving one or more transport blocks during the set of multiple reception occasions over the set of multiple slots.

In some aspects, the resource activation component 735 is capable of, configured to, or operable to support a means for receiving second control information configured to activate the resource allocation for the reception of the periodic multi-slot multi-cast transmissions based on a radio network temporary identifier associated with group signaling.

In some aspects, the one or more transport blocks includes an initial instance of a first transport block and one or more additional instances of the first transport block.

In some aspects, the one or more transport blocks includes one or more instances of a second transport block different from the first transport block. In some aspects, an order within the set of multiple reception occasions of the initial instance of the first transport block, the one or more additional instances of the first transport block, and the one or more instances of the second transport block is in accordance with an indicated order.

In some aspects, the feedback component 740 is capable of, configured to, or operable to support a means for transmitting a negative acknowledgment, where the negative acknowledgment is indicative of non-receipt of an initial instance of a first transport block of the one or more transport blocks during a first reception occasion, where the one or more transport blocks includes one or more retransmissions of the first transport block during additional reception occasions that are subsequent to the first reception occasion.

In some aspects, the monitoring skipping component 745 is capable of, configured to, or operable to support a means for skipping, based on a successful decode of a first transport block received during a first reception occasion, monitoring for an additional one or more reception occasions that are subsequent to the first reception occasion, where the additional one or more reception occasions are associated with respective retransmissions of the first transport block, and where the one or more transport blocks include the first transport block.

In some aspects, the one or more transport blocks includes a set of multiple instances of a first transport block. In some aspects, a first one or more instances of the set of multiple instances of the first transport block are encoded using a first modulation and coding scheme. In some aspects, a second one or more instances of the set of multiple instances are encoded using a second modulation and coding scheme that is different from the first modulation and coding scheme.

In some aspects, the one or more transport blocks includes a set of multiple instances of a first transport block. In some aspects, an initial instance of the set of multiple instances of the first transport block is encoded with a higher modulation and coding scheme than subsequent instances of the set of multiple instances of the first transport block.

In some aspects, the low power mode component 750 is capable of, configured to, or operable to support a means for entering a low power state based on a successful decode of an initial instance of a set of multiple instances of a first transport block, where the first network node is configured to not decode subsequent instances of the set of multiple instances of the first transport block due to the low power state.

In some aspects, the feedback component 740 is capable of, configured to, or operable to support a means for transmitting feedback information that indicates a respective acknowledgment or a respective negative acknowledgment for the one or more transport blocks on a per-transport block basis.

In some aspects, the feedback component 740 is capable of, configured to, or operable to support a means for transmitting feedback information that indicates bundled acknowledgment or bundled negative acknowledgment for a portion of the one or more transport blocks, where each transport block of the portion has a same radio network temporary identifier.

In some aspects, the feedback component 740 is capable of, configured to, or operable to support a means for transmitting first feedback information only if a non-receipt of at least one of the one or more transport blocks occurs.

In some aspects, the feedback component 740 is capable of, configured to, or operable to support a means for transmitting second feedback information, based on transmission of the first feedback information, that indicates a respective acknowledgment or a respective negative acknowledgment for the one or more transport blocks on a per-transport block basis.

In some aspects, the feedback scheme component 760 is capable of, configured to, or operable to support a means for receiving feedback scheme information that defines that the second feedback information is acknowledgment-only, negative acknowledgment-only, or both.

In some aspects, the capability component 755 is capable of, configured to, or operable to support a means for transmitting second control information that indicates a capability of the first network node to support the reception of the periodic multi-slot multi-cast transmissions.

In some aspects, the resource allocation component 725 is capable of, configured to, or operable to support a means for receiving second control information indicative of a second resource allocation for the reception of the periodic multi-slot multi-cast transmissions, where the second resource allocation includes a single reception occasion over a second set of multiple slots.

In some aspects, the resource allocation component 725 is capable of, configured to, or operable to support a means for receiving second control information indicative of a second resource allocation for the reception of periodic unicast transmissions, where the second resource allocation defines a second unicast reception period that is repeated based on a second periodicity.

In some aspects, the first control information is indicative of a second resource allocation for the reception of the periodic multi-slot multi-cast transmissions. In some aspects, the second resource allocation includes a single reception occasion over a second set of multiple slots.

In some aspects, the first control information is indicative of a second resource allocation for the reception of periodic unicast transmissions.

In some aspects, the first control information identifies a first quantity of the set of multiple slots, a second quantity of downlink shared channel occasions of the resource allocation, a third quantity of reception occasions in each slot of the set of multiple slots, or any combination thereof.

In some aspects, the first quantity of the set of multiple slots, the second quantity of downlink shared channel occasions, or the third quantity of downlink shared channel occasions, or any combination thereof, are based on a respective radio network temporary identifier.

Figure 8:
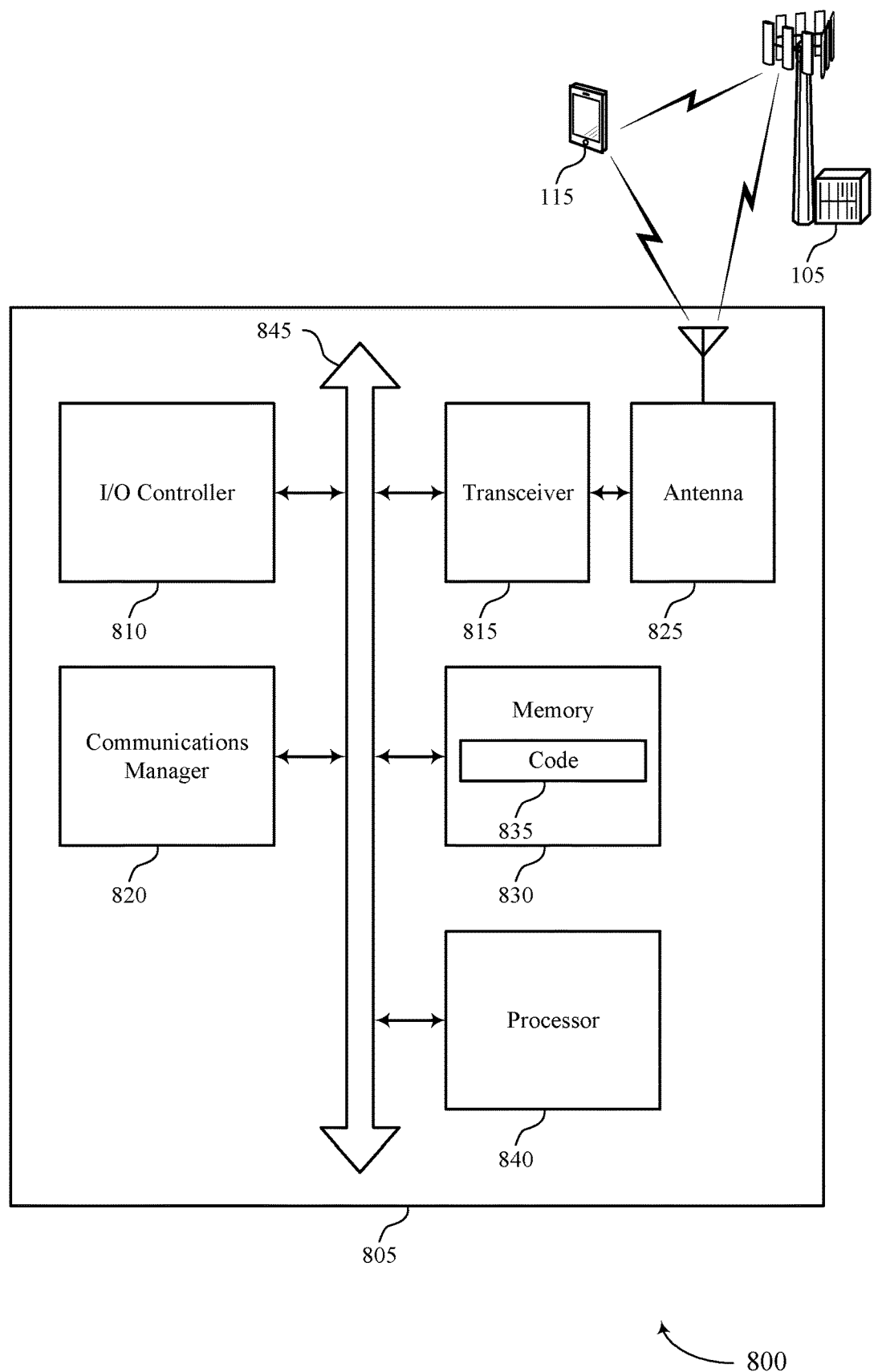
FIG. 8 shows a diagram of a system including a device that supports multi-cast multi-slot SPS communications in accordance with one or more aspects of the present disclosure.

FIG. 8 shows a diagram of a system 800 including a device 805 that supports multi-cast multi-slot SPS communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting multi-cast multi-slot SPS communications). For example, the device 805 or a component of the device 805 may include a processor 840 and memory 830 coupled with or to the processor 840, the processor 840 and memory 830 configured to perform various functions described herein.

The communications manager 820 may support wireless communication at a first network node in accordance with examples as disclosed herein. For example, the communications manager 820 is capable of, configured to, or operable to support a means for receiving first control information indicative of a resource allocation for reception of periodic multi-slot multi-cast transmissions, where the resource allocation includes a set of multiple reception occasions over a set of multiple slots. The communications manager 820 is capable of, configured to, or operable to support a means for receiving one or more transport blocks during the set of multiple reception occasions over the set of multiple slots.

By including or configuring the communications manager 820 in accordance with examples as described herein, the device 805 may support techniques for reduced latency, more efficient utilization of communication resources, and improved coordination between devices.

In some aspects, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some aspects, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of multi-cast multi-slot SPS communications as described herein, or the processor 840 and the memory 830 may be otherwise configured to perform or support such operations.

Figure 9:
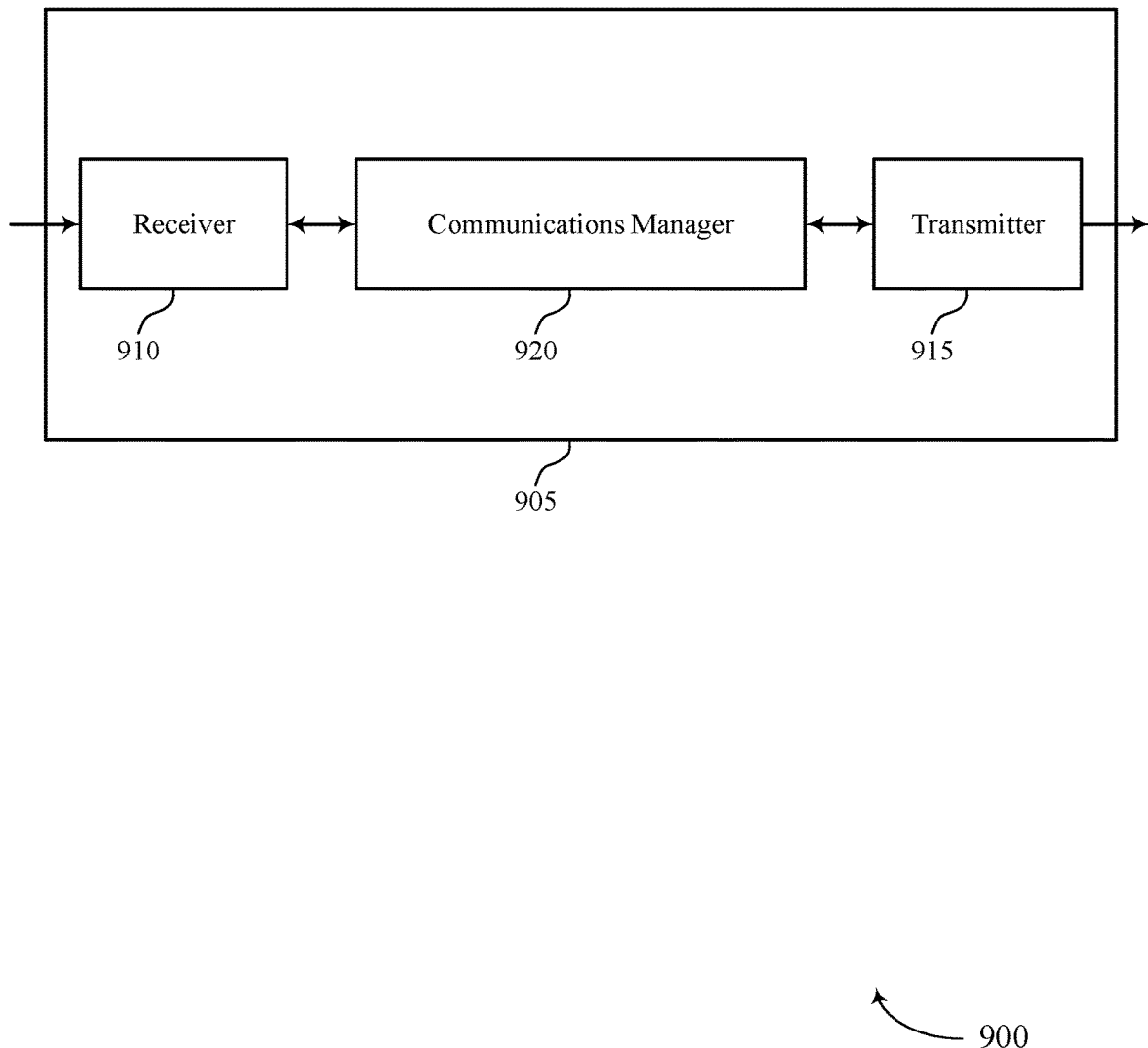
FIGS. 9 and 10 show block diagrams of devices that support multi-cast multi-slot SPS communications in accordance with one or more aspects of the present disclosure.

FIG. 9 shows a block diagram 900 of a device 905 that supports multi-cast multi-slot SPS communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some aspects, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some aspects, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of multi-cast multi-slot SPS communications as described herein. For example, the communications manager 920, the receiver 910, the transmitter 915, or various combinations or components thereof may support a method for performing one or more of the functions described herein.

In some aspects, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first network node in accordance with examples as disclosed herein. For example, the communications manager 920 is capable of, configured to, or operable to support a means for transmitting first control information indicative of a resource allocation for reception of periodic multi-slot multi-cast transmissions, where the resource allocation includes a set of multiple reception occasions over a set of multiple slots. The communications manager 920 is capable of, configured to, or operable to support a means for transmitting one or more transport blocks during the set of multiple reception occasions over the set of multiple slots.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources.

Figure 10:
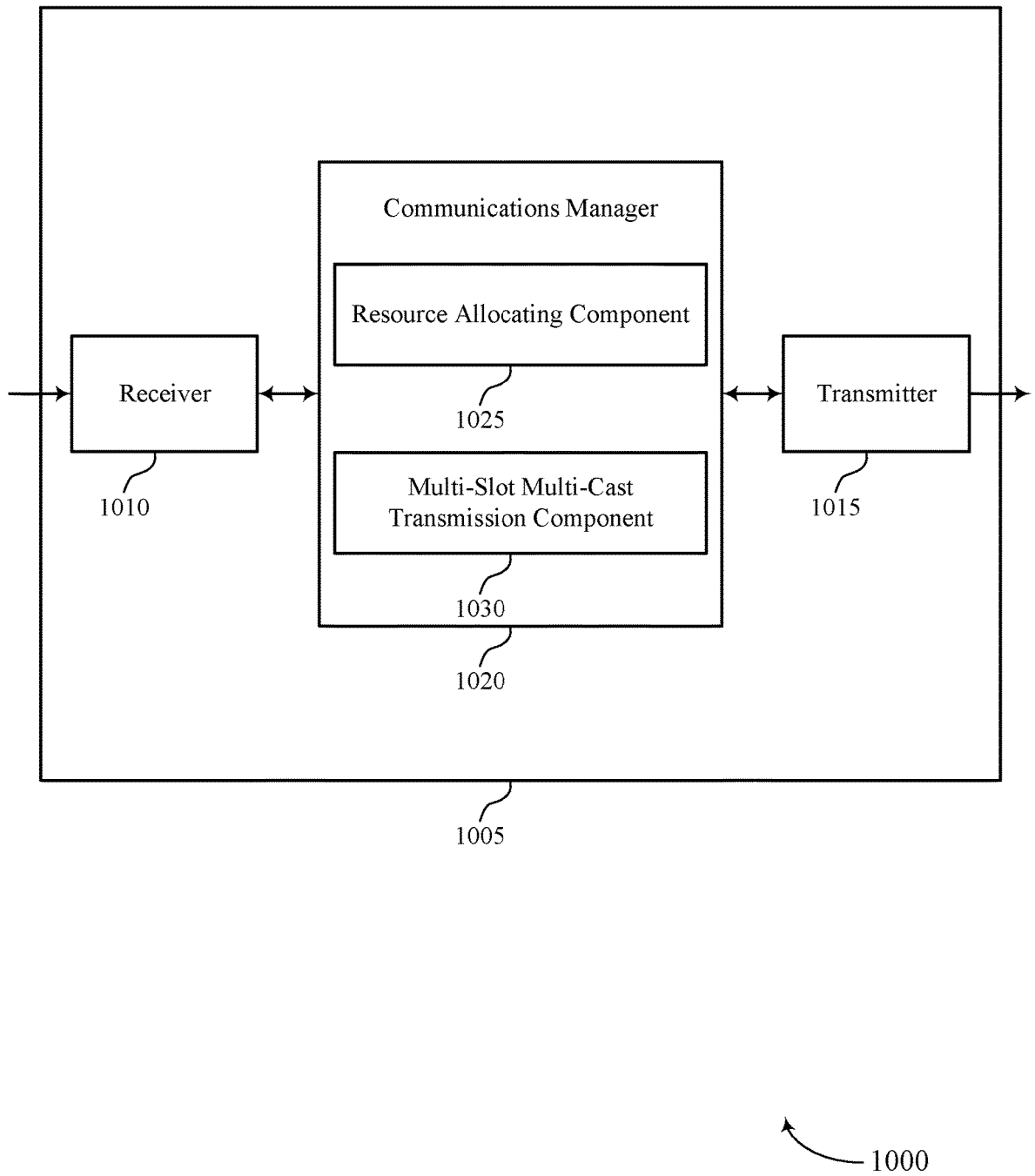

FIG. 10 shows a block diagram 1000 of a device 1005 that supports multi-cast multi-slot SPS communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some aspects, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some aspects, the transmitter 1015 and the receiver 1010 may be co-located in a transceiver, which may include or be coupled with a modem.

The device 1005, or various components thereof, may be an example of means for performing various aspects of multi-cast multi-slot SPS communications as described herein. For example, the communications manager 1020 may include a resource allocating component 1025 a multi-slot multi-cast transmission component 1030, or any combination thereof. The communications manager 1020 may be an example of aspects of a communications manager 920 as described herein. In some aspects, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first network node in accordance with examples as disclosed herein. The resource allocating component 1025 is capable of, configured to, or operable to support a means for transmitting first control information indicative of a resource allocation for reception of periodic multi-slot multi-cast transmissions, where the resource allocation includes a set of multiple reception occasions over a set of multiple slots. The multi-slot multi-cast transmission component 1030 is capable of, configured to, or operable to support a means for transmitting one or more transport blocks during the set of multiple reception occasions over the set of multiple slots.

Figure 11:
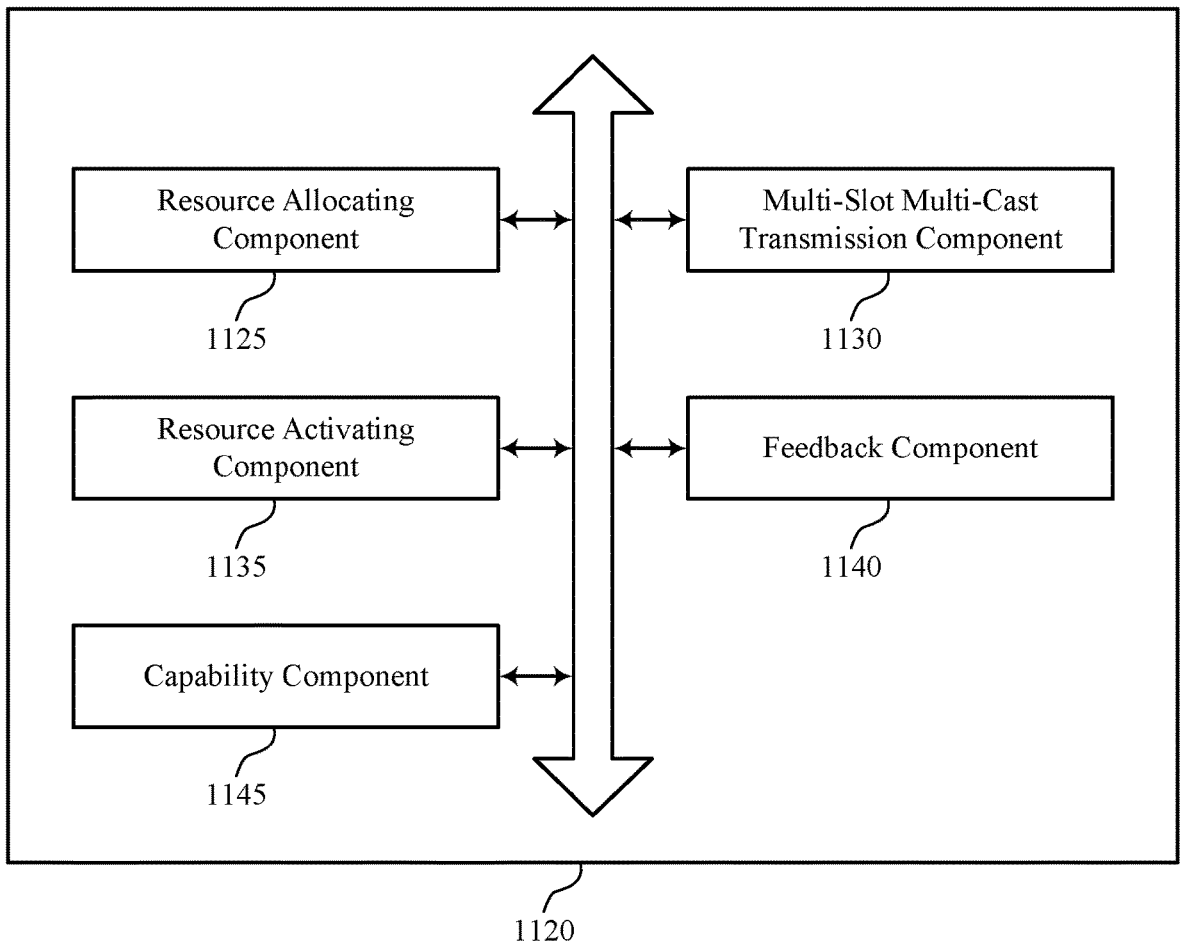
FIG. 11 shows a block diagram of a communications manager that supports multi-cast multi-slot SPS communications in accordance with one or more aspects of the present disclosure.

FIG. 11 shows a block diagram 1100 of a communications manager 1120 that supports multi-cast multi-slot SPS communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of multi-cast multi-slot SPS communications as described herein. For example, the communications manager 1120 may include a resource allocating component 1125, a multi-slot multi-cast transmission component 1130, a resource activating component 1135, a feedback component 1140, a capability component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a first network node in accordance with examples as disclosed herein. The resource allocating component 1125 is capable of, configured to, or operable to support a means for transmitting first control information indicative of a resource allocation for reception of periodic multi-slot multi-cast transmissions, where the resource allocation includes a set of multiple reception occasions over a set of multiple slots. The multi-slot multi-cast transmission component 1130 is capable of, configured to, or operable to support a means for transmitting one or more transport blocks during the set of multiple reception occasions over the set of multiple slots.

In some aspects, the resource activating component 1135 is capable of, configured to, or operable to support a means for transmitting second control information configured to activate the resource allocation for the reception of the periodic multi-slot multi-cast transmissions based on a radio network temporary identifier associated with group signaling.

In some aspects, the one or more transport blocks includes an initial instance of a first transport block and one or more additional instances of the first transport block.

In some aspects, the feedback component 1140 is capable of, configured to, or operable to support a means for receiving a negative acknowledgment, where the negative acknowledgment is indicative of non-receipt of an initial instance of a first transport block of the one or more transport blocks during a first reception occasion, where the one or more transport blocks includes one or more retransmissions of the first transport block during additional reception occasions that are subsequent to the first reception occasion.

In some aspects, the one or more transport blocks includes a set of multiple instances of a first transport block. In some aspects, a first one or more instances of the set of multiple instances of the first transport block are encoded using a first modulation and coding scheme. In some aspects, a second one or more instances of the set of multiple instances are encoded using a second modulation and coding scheme that is different from the first modulation and coding scheme.

In some aspects, the feedback component 1140 is capable of, configured to, or operable to support a means for receiving feedback information that indicates a respective acknowledgment or a respective negative acknowledgment for the one or more transport blocks on a per-transport block basis.

In some aspects, the capability component 1145 is capable of, configured to, or operable to support a means for receiving second control information that indicates a capability of a second network node to support the reception of the periodic multi-slot multi-cast transmissions.

Figure 12:
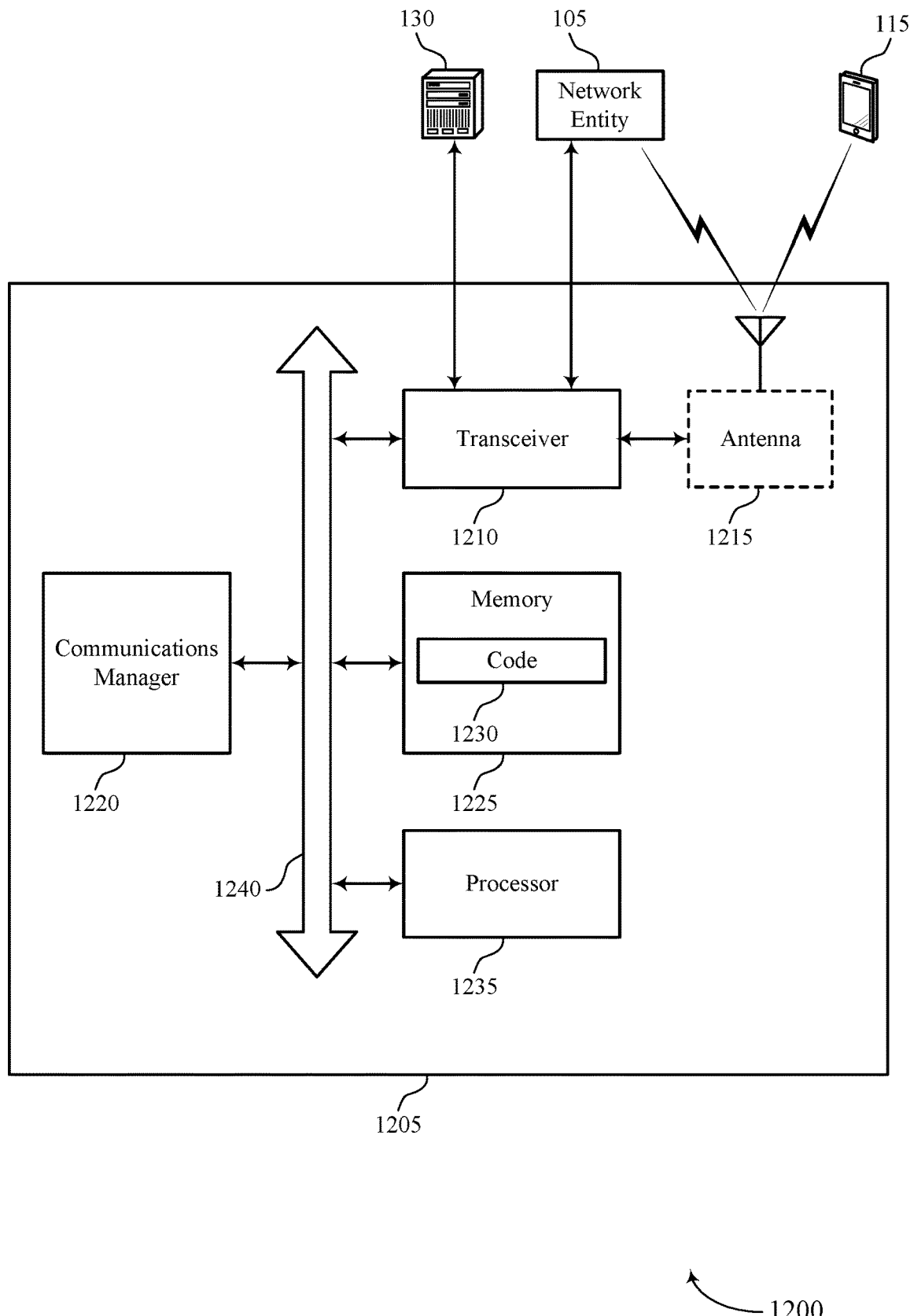
FIG. 12 shows a diagram of a system including a device that supports multi-cast multi-slot SPS communications in accordance with one or more aspects of the present disclosure.

FIG. 12 shows a diagram of a system 1200 including a device 1205 that supports multi-cast multi-slot SPS communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some aspects, the transceiver 1210 may include a wired transceiver and may communicate bi-directionally with another wired transceiver. Additionally, or alternatively, in some aspects, the transceiver 1210 may include a wireless transceiver and may communicate bi-directionally with another wireless transceiver. In some aspects, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some aspects, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting multi-cast multi-slot SPS communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1240 may support communications of (e.g., within) a protocol layer of a protocol stack. In some aspects, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some aspects, the communications manager 1220 may manage aspects of communications with a core network 130 (e.g., via one or more wired or wireless backhaul links). For example, the communications manager 1220 may manage the transfer of data communications for client devices, such as one or more UEs 115. In some aspects, the communications manager 1220 may manage communications with other network entities 105, and may include a controller or scheduler for controlling communications with UEs 115 in cooperation with other network entities 105. In some aspects, the communications manager 1220 may support an X2 interface within an LTE/LTE-A wireless communications network technology to provide communication between network entities 105.

The communications manager 1220 may support wireless communications at a first network node in accordance with examples as disclosed herein. For example, the communications manager 1220 is capable of, configured to, or operable to support a means for transmitting first control information indicative of a resource allocation for reception of periodic multi-slot multi-cast transmissions, where the resource allocation includes a set of multiple reception occasions over a set of multiple slots. The communications manager 1220 is capable of, configured to, or operable to support a means for transmitting one or more transport blocks during the set of multiple reception occasions over the set of multiple slots.

By including or configuring the communications manager 1220 in accordance with examples as described herein, the device 1205 may support techniques for more efficient utilization of communication resources and improved coordination between devices.

In some aspects, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some aspects, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of multi-cast multi-slot SPS communications as described herein, or the processor 1235 and the memory 1225 may be otherwise configured to perform or support such operations.

Figure 13:
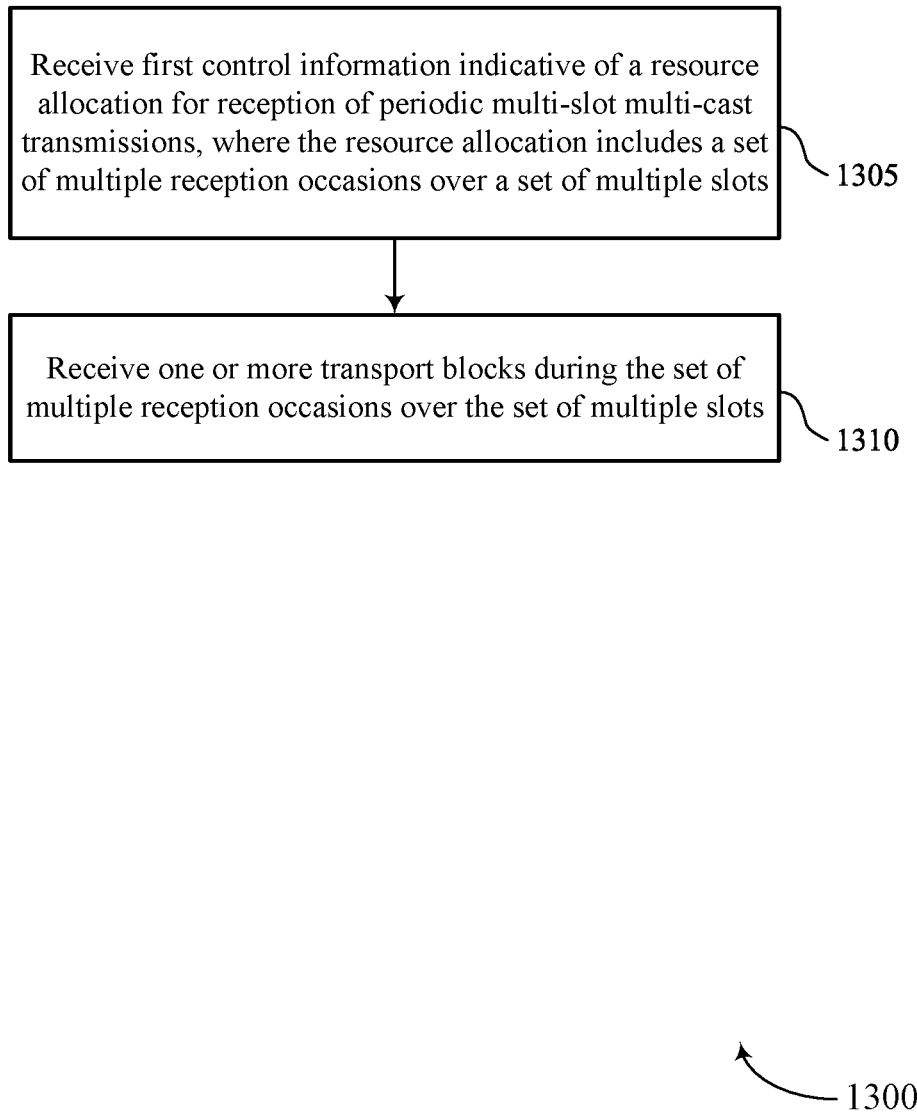
FIGS. 13 through 16 show flowcharts illustrating methods that support multi-cast multi-slot SPS communications in accordance with one or more aspects of the present disclosure.

FIG. 13 shows a flowchart illustrating a method 1300 that supports multi-cast multi-slot SPS communications in accordance with aspects of the present disclosure. The operations of the method 1300 may be implemented by a UE or its components as described herein. For example, the operations of the method 1300 may be performed by a UE 115 as described with reference to FIGS. 1 through 8. In some aspects, a UE may execute a set of instructions to control the functional elements of the UE to perform the described functions. Additionally, or alternatively, the UE may perform aspects of the described functions using special-purpose hardware.

At 1305, the method may include receiving first control information indicative of a resource allocation for reception of periodic multi-slot multi-cast transmissions, where the resource allocation includes a set of multiple reception occasions over a set of multiple slots. The operations of block 1305 may be performed in accordance with examples as disclosed herein. In some aspects, aspects of the operations of 1305 may be performed by a resource allocation component 725 as described with reference to FIG. 7.

At 1310, the method may include receiving one or more transport blocks during the set of multiple reception occasions over the set of multiple slots. The operations of block 1310 may be performed in accordance with examples as disclosed herein. In some aspects, aspects of the operations of 1310 may be performed by a multi-slot multi-cast reception component 730 as described with reference to FIG. 7.

Figure 14:
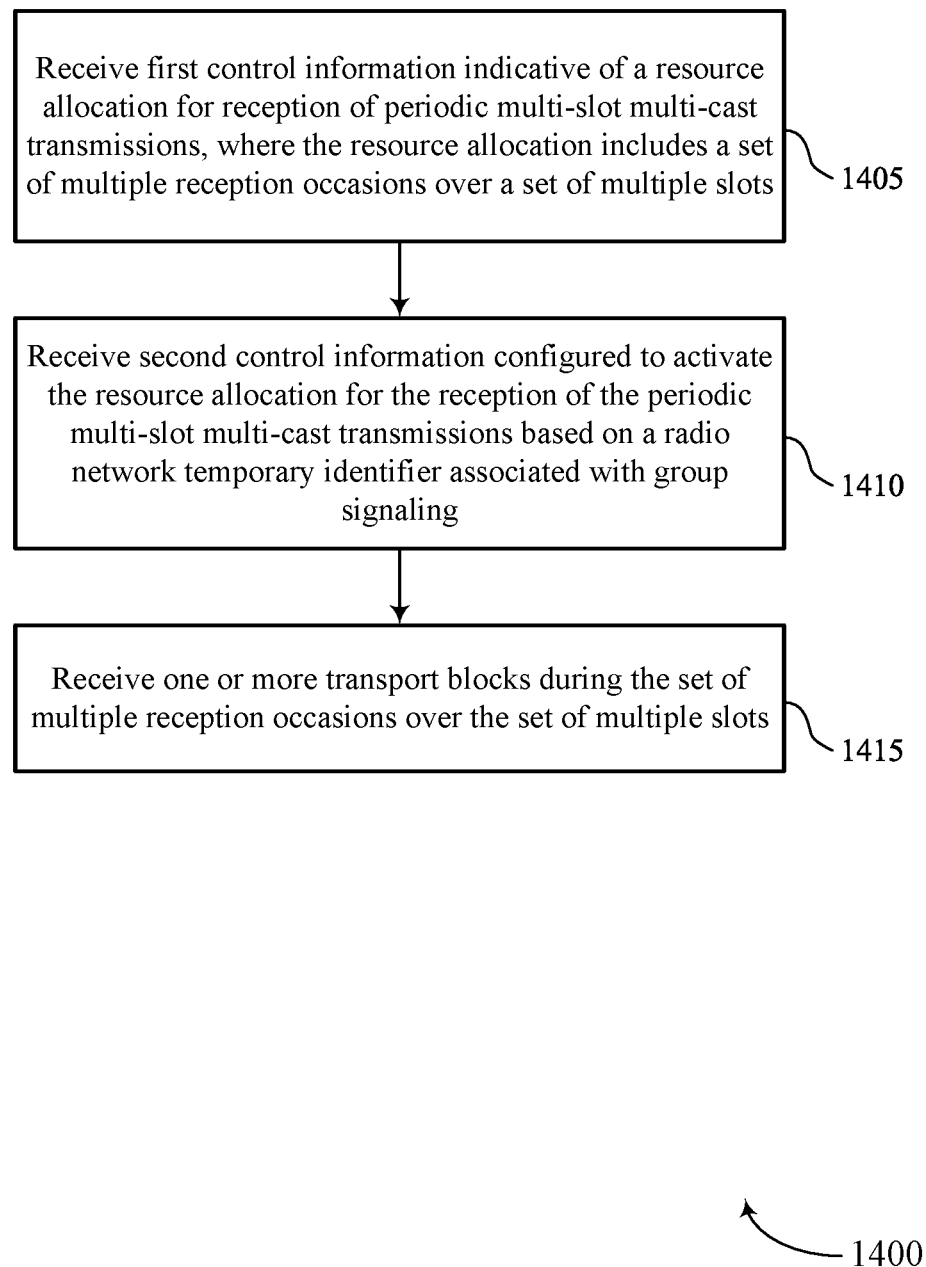

FIG. 14 shows a flowchart illustrating a method 1400 that supports multi-cast multi-slot SPS communications in accordance with aspects of the present disclosure. The operations of the method 1400 may be implemented by a UE or its components as described herein. For example, the operations of the method 1400 may be performed by a UE 115 as described with reference to FIGS. 1 through 8. In some aspects, a UE may execute a set of instructions to control the functional elements of the UE to perform the described functions. Additionally, or alternatively, the UE may perform aspects of the described functions using special-purpose hardware.

At 1405, the method may include receiving first control information indicative of a resource allocation for reception of periodic multi-slot multi-cast transmissions, where the resource allocation includes a set of multiple reception occasions over a set of multiple slots. The operations of block 1405 may be performed in accordance with examples as disclosed herein. In some aspects, aspects of the operations of 1405 may be performed by a resource allocation component 725 as described with reference to FIG. 7.

At 1410, the method may include receiving second control information configured to activate the resource allocation for the reception of the periodic multi-slot multi-cast transmissions based on a radio network temporary identifier associated with group signaling. The operations of block 1410 may be performed in accordance with examples as disclosed herein. In some aspects, aspects of the operations of 1410 may be performed by a resource activation component 735 as described with reference to FIG. 7.

At 1415, the method may include receiving one or more transport blocks during the set of multiple reception occasions over the set of multiple slots. The operations of block 1415 may be performed in accordance with examples as disclosed herein. In some aspects, aspects of the operations of 1415 may be performed by a multi-slot multi-cast reception component 730 as described with reference to FIG. 7.

Figure 15:
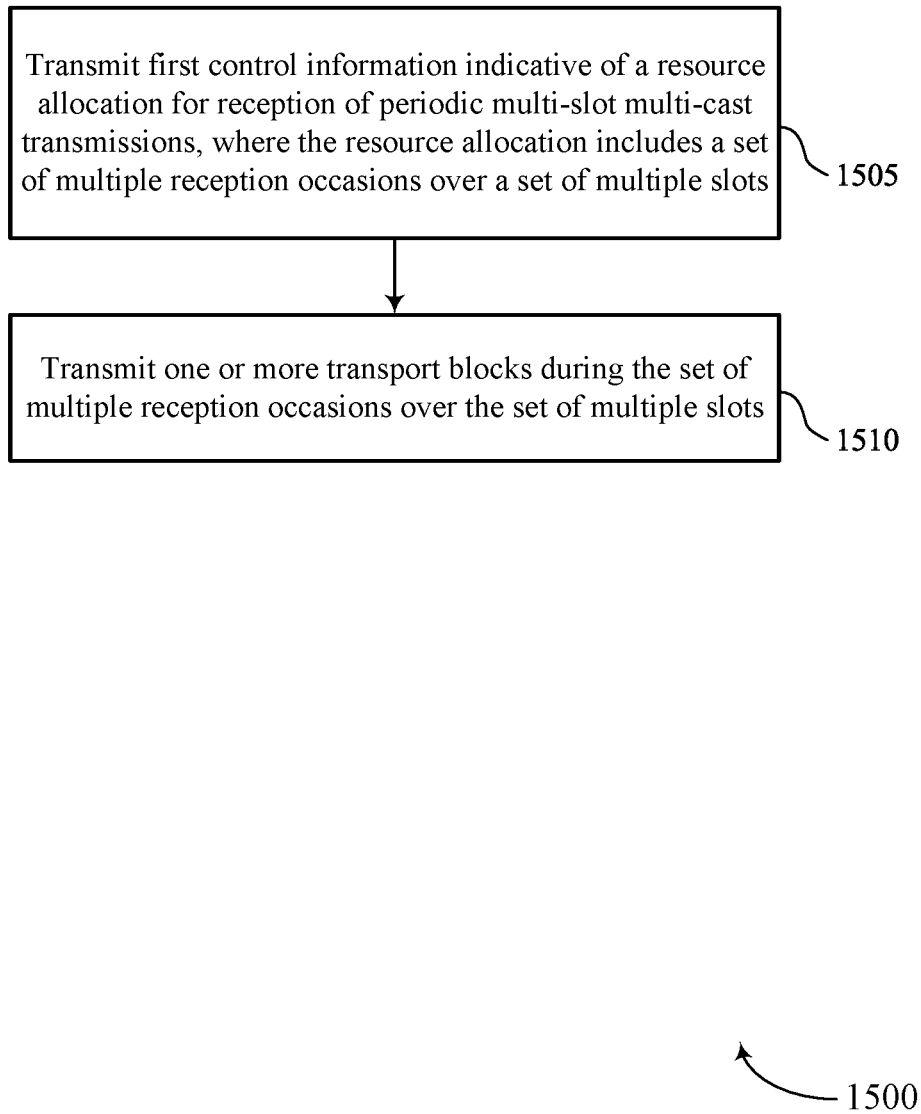

FIG. 15 shows a flowchart illustrating a method 1500 that supports multi-cast multi-slot SPS communications in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some aspects, a network entity may execute a set of instructions to control the functional elements of the network entity to perform the described functions. Additionally, or alternatively, the network entity may perform aspects of the described functions using special-purpose hardware.

At 1505, the method may include transmitting first control information indicative of a resource allocation for reception of periodic multi-slot multi-cast transmissions, where the resource allocation includes a set of multiple reception occasions over a set of multiple slots. The operations of block 1505 may be performed in accordance with examples as disclosed herein. In some aspects, aspects of the operations of 1505 may be performed by a resource allocating component 1125 as described with reference to FIG. 11.

At 1510, the method may include transmitting one or more transport blocks during the set of multiple reception occasions over the set of multiple slots. The operations of block 1510 may be performed in accordance with examples as disclosed herein. In some aspects, aspects of the operations of 1510 may be performed by a multi-slot multi-cast transmission component 1130 as described with reference to FIG. 11.

Figure 16:
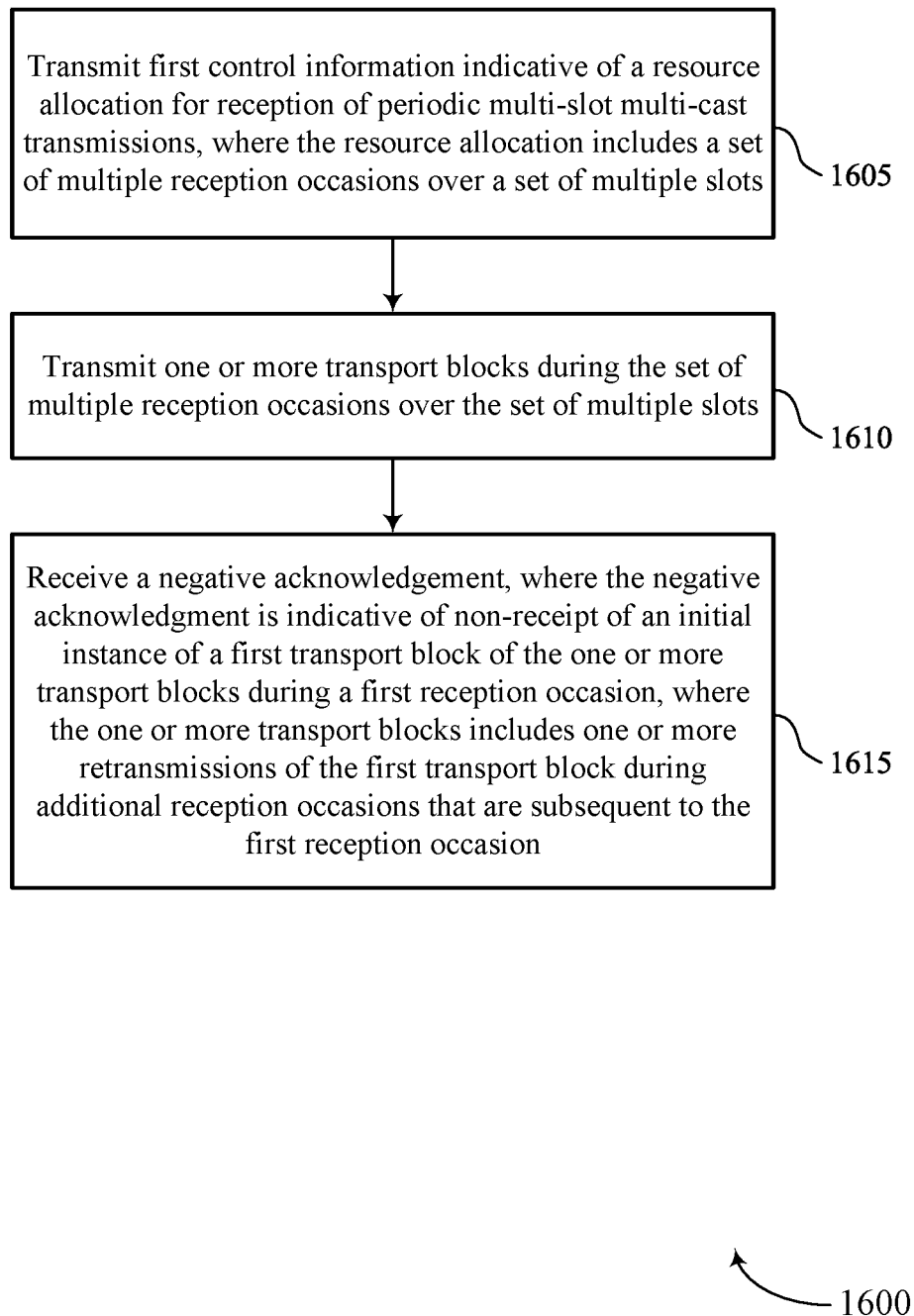

FIG. 16 shows a flowchart illustrating a method 1600 that supports multi-cast multi-slot SPS communications in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some aspects, a network entity may execute a set of instructions to control the functional elements of the network entity to perform the described functions. Additionally, or alternatively, the network entity may perform aspects of the described functions using special-purpose hardware.

At 1605, the method may include transmitting first control information indicative of a resource allocation for reception of periodic multi-slot multi-cast transmissions, where the resource allocation includes a set of multiple reception occasions over a set of multiple slots. The operations of block 1605 may be performed in accordance with examples as disclosed herein. In some aspects, aspects of the operations of 1605 may be performed by a resource allocating component 1125 as described with reference to FIG. 11.

At 1610, the method may include transmitting one or more transport blocks during the set of multiple reception occasions over the set of multiple slots. The operations of block 1610 may be performed in accordance with examples as disclosed herein. In some aspects, aspects of the operations of 1610 may be performed by a multi-slot multi-cast transmission component 1130 as described with reference to FIG. 11.

At 1615, the method may include receiving a negative acknowledgment, where the negative acknowledgment is indicative of non-receipt of an initial instance of a first transport block of the one or more transport blocks during a first reception occasion, where the one or more transport blocks includes one or more retransmissions of the first transport block during additional reception occasions that are subsequent to the first reception occasion. The operations of block 1615 may be performed in accordance with examples as disclosed herein. In some aspects, aspects of the operations of 1615 may be performed by a feedback component 1140 as described with reference to FIG. 11.

The following provides an overview of aspects of the present disclosure:

Aspect 1: A method of wireless communication performed by a first network node, comprising: receiving first control information indicative of a resource allocation for reception of periodic multi-slot multi-cast transmissions, wherein the resource allocation comprises a plurality of reception occasions over a plurality of slots; and receiving one or more transport blocks during the plurality of reception occasions over the plurality of slots.

Aspect 2: The first network node of aspect 1, further comprising: receiving second control information configured to activate the resource allocation for the reception of the periodic multi-slot multi-cast transmissions based on a radio network temporary identifier associated with group signaling.

Aspect 3: The first network node of any of aspects 1 through 2, wherein the one or more transport blocks includes an initial instance of a first transport block and one or more additional instances of the first transport block.

Aspect 4: The first network node of aspect 3, wherein the one or more transport blocks includes one or more instances of a second transport block different from the first transport block, and an order within the plurality of reception occasions of the initial instance of the first transport block, the one or more additional instances of the first transport block, and the one or more instances of the second transport block is in accordance with an indicated order.

Aspect 5: The first network node of any of aspects 1 through 4, further comprising: transmitting a negative acknowledgement, wherein the negative acknowledgment is indicative of non-receipt of an initial instance of a first transport block of the one or more transport blocks during a first reception occasion, wherein the one or more transport blocks includes one or more retransmissions of the first transport block during additional reception occasions that are subsequent to the first reception occasion.

Aspect 6: The first network node of any of aspects 1 through 5, further comprising: skipping, based on a successful decode of a first transport block received during a first reception occasion, monitoring for an additional one or more reception occasions that are subsequent to the first reception occasion, wherein the additional one or more reception occasions are associated with respective retransmissions of the first transport block, and wherein the one or more transport blocks include the first transport block.

Aspect 7: The first network node of any of aspects 1 through 6, wherein the one or more transport blocks includes a plurality of instances of a first transport block, and a first one or more instances of the plurality of instances of the first transport block are encoded using a first modulation and coding scheme, and a second one or more instances of the plurality of instances are encoded using a second modulation and coding scheme that is different from the first modulation and coding scheme.

Aspect 8: The first network node of any of aspects 1 through 7, wherein the one or more transport blocks includes a plurality of instances of a first transport block, and an initial instance of the plurality of instances of the first transport block is encoded with a higher modulation and coding scheme than subsequent instances of the plurality of instances of the first transport block.

Aspect 9: The first network node of any of aspects 1 through 8, further comprising: entering a low power state based on a successful decode of an initial instance of a plurality of instances of a first transport block, wherein the first network node is configured to not decode subsequent instances of the plurality of instances of the first transport block due to the low power state.

Aspect 10: The first network node of any of aspects 1 through 9, further comprising: transmitting feedback information that indicates a respective acknowledgment or a respective negative acknowledgment for the one or more transport blocks on a per-transport block basis.

Aspect 11: The first network node of any of aspects 1 through 10, further comprising: transmitting feedback information that indicates bundled acknowledgment or bundled negative acknowledgment for a portion of the one or more transport blocks, wherein each transport block of the portion has a same radio network temporary identifier.

Aspect 12: The first network node of any of aspects 1 through 11, further comprising: transmitting first feedback information only if a non-receipt of at least one of the one or more transport blocks occurs.

Aspect 13: The first network node of aspect 12, further comprising: transmitting second feedback information, based on transmission of the first feedback information, that indicates a respective acknowledgment or a respective negative acknowledgment for the one or more transport blocks on a per-transport block basis.

Aspect 14: The first network node of aspect 13, further comprising: receiving feedback scheme information that defines that the second feedback information is acknowledgment-only, negative acknowledgment-only, or both.

Aspect 15: The first network node of any of aspects 1 through 14, further comprising: transmitting second control information that indicates a capability of the first network node to support the reception of the periodic multi-slot multi-cast transmissions.

Aspect 16: The first network node of any of aspects 1 through 15, further comprising: receiving second control information indicative of a second resource allocation for the reception of the periodic multi-slot multi-cast transmissions, wherein the second resource allocation comprises a single reception occasion over a second plurality of slots.

Aspect 17: The first network node of any of aspects 1 through 16, further comprising: receiving second control information indicative of a second resource allocation for the reception of periodic unicast transmissions, wherein the second resource allocation defines a second unicast reception period that is repeated based on a second periodicity.

Aspect 18: The first network node of any of aspects 1 through 17, wherein the first control information is indicative of a second resource allocation for the reception of the periodic multi-slot multi-cast transmissions, the second resource allocation comprises a single reception occasion over a second plurality of slots.

Aspect 19: The first network node of any of aspects 1 through 18, wherein the first control information is indicative of a second resource allocation for the reception of periodic unicast transmissions.

Aspect 20: The first network node of any of aspects 1 through 19, wherein the first control information identifies a first quantity of the plurality of slots, a second quantity of downlink shared channel occasions of the resource allocation, a third quantity of reception occasions in each slot of the plurality of slots, or any combination thereof.

Aspect 21: The first network node of aspect 20, wherein the first quantity of the plurality of slots, the second quantity of downlink shared channel occasions, or the third quantity of downlink shared channel occasions, or any combination thereof, are based on a respective radio network temporary identifier.

Aspect 22: A method for wireless communications at a first network node, comprising: transmitting first control information indicative of a resource allocation for reception of periodic multi-slot multi-cast transmissions, wherein the resource allocation comprises a plurality of reception occasions over a plurality of slots; and transmitting one or more transport blocks during the plurality of reception occasions over the plurality of slots.

Aspect 23: The first network node of aspect 22, further comprising: transmitting second control information configured to activate the resource allocation for the reception of the periodic multi-slot multi-cast transmissions based a radio network temporary identifier associated with group signaling.

Aspect 24: The first network node of any of aspects 22 through 23, wherein the one or more transport blocks includes an initial instance of a first transport block and one or more additional instances of the first transport block.

Aspect 25: The first network node of any of aspects 22 through 24, further comprising: receiving a negative acknowledgment, wherein the negative acknowledgment is indicative of non-receipt of an initial instance of a first transport block of the one or more transport blocks during a first reception occasion, wherein the one or more transport blocks includes one or more retransmissions of the first transport block during additional reception occasions that are subsequent to the first reception occasion.

Aspect 26: The first network node of any of aspects 22 through 25, wherein the one or more transport blocks includes a plurality of instances of a first transport block, and a first one or more instances of the plurality of instances of the first transport block are encoded using a first modulation and coding scheme, and a second one or more instances of the plurality of instances are encoded using a second modulation and coding scheme that is different from the first modulation and coding scheme.

Aspect 27: The first network node of any of aspects 22 through 26, further comprising: receiving feedback information that indicates a respective acknowledgment or a respective negative acknowledgment for the one or more transport blocks on a per-transport block basis.

Aspect 28: The first network node of any of aspects 22 through 27, further comprising: receiving second control information that indicates a capability of a second network node to support the reception of the periodic multi-slot multi-cast transmissions.

Aspect 29: An apparatus for wireless communication at a first network node, comprising a processor; memory coupled with the processor; and instructions stored in the memory and executable by the processor to cause the apparatus to perform a method of any of aspects 1 through 21.

Aspect 30: An apparatus for wireless communication at a first network node, comprising at least one means for performing a method of any of aspects 1 through 21.

Aspect 31: A non-transitory computer-readable medium having code for wireless communication stored thereon that, when executed by a first network node, causes the network node to perform a method of any of aspects 1 through 21.

Aspect 32: An apparatus for wireless communications at a first network node, comprising a processor; memory coupled with the processor; and instructions stored in the memory and executable by the processor to cause the apparatus to perform a method of any of aspects 22 through 28.

Aspect 33: An apparatus for wireless communications at a first network node, comprising at least one means for performing a method of any of aspects 22 through 28.

Aspect 34: A non-transitory computer-readable medium having code for wireless communication stored thereon that, when executed by a first network node, causes the network node to perform a method of any of aspects 22 through 28.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
   a memory; and
   at least one processor coupled to the memory, wherein the at least one processor is configured to:
   receive first control information indicative of a resource allocation for reception of periodic multi-slot multicast transmissions, wherein the resource allocation comprises a plurality of reception occasions over a plurality of slots; and
   receive one or more transport blocks during the plurality of reception occasions over the plurality of slots.

2. The first network node of claim 1, wherein the at least one processor is configured to:
   receive second control information configured to activate the resource allocation for the reception of the periodic multi-slot multi-cast transmissions based on a radio network temporary identifier associated with group signaling.

3. The first network node of claim 1, wherein the one or more transport blocks includes an initial instance of a first transport block and one or more additional instances of the first transport block.

4. The first network node of claim 3, wherein the one or more transport blocks includes one or more instances of a second transport block different from the first transport block, and wherein an order within the plurality of reception occasions of the initial instance of the first transport block, the one or more additional instances of the first transport block, and the one or more instances of the second transport block is in accordance with an indicated order.

5. The first network node of claim 1, wherein the at least one processor is configured to:
transmit a negative acknowledgment, wherein the negative acknowledgment is indicative of non-receipt of an initial instance of a first transport block of the one or more transport blocks during a first reception occasion, wherein the one or more transport blocks includes one or more retransmissions of the first transport block during additional reception occasions that are subsequent to the first reception occasion.

6. The first network node of claim 1, wherein the at least one processor is configured to:
skip, based on a successful decode of a first transport block received during a first reception occasion, monitoring for an additional one or more reception occasions that are subsequent to the first reception occasion, wherein the additional one or more reception occasions are associated with respective retransmissions of the first transport block, and wherein the one or more transport blocks include the first transport block.

7. The first network node of claim 1, wherein the one or more transport blocks includes a plurality of instances of a first transport block, and wherein a first one or more instances of the plurality of instances of the first transport block are encoded using a first modulation and coding scheme, and wherein a second one or more instances of the plurality of instances are encoded using a second modulation and coding scheme that is different from the first modulation and coding scheme.

8. The first network node of claim 1, wherein the one or more transport blocks includes a plurality of instances of a first transport block, and wherein an initial instance of the plurality of instances of the first transport block is encoded with a higher modulation and coding scheme than subsequent instances of the plurality of instances of the first transport block.

9. The first network node of claim 1, wherein the at least one processor is configured to:
enter a low power state based on a successful decode of an initial instance of a plurality of instances of a first transport block, wherein the first network node is configured to not decode subsequent instances of the plurality of instances of the first transport block due to the low power state.

10. The first network node of claim 1, wherein the at least one processor is configured to:
transmit feedback information that indicates a respective acknowledgment or a respective negative acknowledgment for the one or more transport blocks on a per-transport block basis.

11. The first network node of claim 1, wherein the at least one processor is configured to:
transmit feedback information that indicates bundled acknowledgment or bundled negative acknowledgment for a portion of the one or more transport blocks, wherein each transport block of the portion has a same radio network temporary identifier.

12. The first network node of claim 1, wherein the at least one processor is configured to:
transmit first feedback information only if a non-receipt of at least one of the one or more transport blocks occurs.

13. The first network node of claim 12, wherein the at least one processor is configured to:
transmit second feedback information, based on transmission of the first feedback information, that indicates a respective acknowledgment or a respective negative acknowledgment for the one or more transport blocks on a per-transport block basis.

14. The first network node of claim 13, wherein the at least one processor is configured to:
receive feedback scheme information that defines that the second feedback information is acknowledgment-only, negative acknowledgment-only, or both.

15. The first network node of claim 1, wherein the at least one processor is configured to:
transmit second control information that indicates a capability of the first network node to support the reception of the periodic multi-slot multi-cast transmissions.

16. The first network node of claim 1, wherein the at least one processor is configured to:
receive second control information indicative of a second resource allocation for the reception of the periodic multi-slot multi-cast transmissions, wherein the second resource allocation comprises a single reception occasion over a second plurality of slots.

17. The first network node of claim 1, wherein the at least one processor is configured to:
receive second control information indicative of a second resource allocation for the reception of periodic unicast transmissions, wherein the second resource allocation defines a second unicast reception period that is repeated based on a second periodicity.

18. The first network node of claim 1, wherein the first control information is indicative of a second resource allocation for the reception of the periodic multi-slot multi-cast transmissions, and wherein the second resource allocation comprises a single reception occasion over a second plurality of slots.

19. The first network node of claim 1, wherein the first control information is indicative of a second resource allocation for the reception of periodic unicast transmissions.

20. The first network node of claim 1, wherein:
the first control information identifies a first quantity of the plurality of slots, a second quantity of downlink shared channel occasions of the resource allocation, a third quantity of reception occasions in each slot of the plurality of slots, or any combination thereof.

21. The first network node of claim 20, wherein:
the first quantity of the plurality of slots, the second quantity of downlink shared channel occasions, or the third quantity of downlink shared channel occasions, or any combination thereof, are based on a respective radio network temporary identifier.

22. A first network node for wireless communications, comprising:
a memory; and
at least one processor coupled to the memory, wherein the at least one processor is configured to:

transmit first control information indicative of a resource allocation for reception of periodic multi-slot multi-cast transmissions, wherein the resource allocation comprises a plurality of reception occasions over a plurality of slots; and transmit one or more transport blocks during the plurality of reception occasions over the plurality of slots.

23. The first network node of claim 22, wherein the at least one processor is configured to:

transmit second control information configured to activate the resource allocation for the reception of the periodic multi-slot multi-cast transmissions based on a radio network temporary identifier associated with group signaling.

24. The first network node of claim 22, wherein the one or more transport blocks includes an initial instance of a first transport block and one or more additional instances of the first transport block.

25. The first network node of claim 22, wherein the at least one processor is configured to:

receive a negative acknowledgment, wherein the negative acknowledgment is indicative of non-receipt of an initial instance of a first transport block of the one or more transport blocks during a first reception occasion, wherein the one or more transport blocks includes one or more retransmissions of the first transport block during additional reception occasions that are subsequent to the first reception occasion.

26. The first network node of claim 22, wherein the one or more transport blocks includes a plurality of instances of a first transport block, and wherein a first one or more instances of the plurality of instances of the first transport block are encoded using a first modulation and coding scheme, and wherein a second one or more instances of the plurality of instances are encoded using a second modulation and coding scheme that is different from the first modulation and coding scheme.

27. The first network node of claim 22, wherein the at least one processor is configured to:

receive feedback information that indicates a respective acknowledgment or a respective negative acknowledgment for the one or more transport blocks on a per-transport block basis.

28. The first network node of claim 22, wherein the at least one processor is configured to:

receive second control information that indicates a capability of a second network node to support the reception of the periodic multi-slot multi-cast transmissions.

29. A method of wireless communication performed by a first network node, comprising:

receiving first control information indicative of a resource allocation for reception of periodic multi-slot multi-cast transmissions, wherein the resource allocation comprises a plurality of reception occasions over a plurality of slots; and receiving one or more transport blocks during the plurality of reception occasions over the plurality of slots.

30. A method of wireless communications performed by a first network node, comprising:

transmitting first control information indicative of a resource allocation for reception of periodic multi-slot multi-cast transmissions, wherein the resource allocation comprises a plurality of reception occasions over a plurality of slots; and transmitting one or more transport blocks during the plurality of reception occasions over the plurality of slots.

* * * * *